(12) United States Patent
Takada

(10) Patent No.: US 11,783,700 B2
(45) Date of Patent: Oct. 10, 2023

(54) PARKING DETECTION SENSOR AND PARKING DETECTION METHOD

(71) Applicant: Yuji Takada, Tokyo (JP)

(72) Inventor: Yuji Takada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 17/617,721

(22) PCT Filed: Jun. 9, 2020

(86) PCT No.: PCT/JP2020/022601
§ 371 (c)(1),
(2) Date: Dec. 9, 2021

(87) PCT Pub. No.: WO2020/250865
PCT Pub. Date: Dec. 17, 2020

(65) Prior Publication Data
US 2022/0238015 A1    Jul. 28, 2022

(30) Foreign Application Priority Data

Jun. 12, 2019  (JP) ................................ 2019-109561

(51) Int. Cl.
*G08G 1/042*     (2006.01)
*G01S 13/04*     (2006.01)
*G01S 13/50*     (2006.01)
*G01S 13/56*     (2006.01)
*G08G 1/14*      (2006.01)

(52) U.S. Cl.
CPC ............ *G08G 1/042* (2013.01); *G01S 13/505* (2013.01); *G01S 13/56* (2013.01); *G08G 1/146* (2013.01); *G08G 1/148* (2013.01)

(58) Field of Classification Search
None
See application file for complete search history.

(56) References Cited

U.S. PATENT DOCUMENTS

| 2004/0073440 A1* | 4/2004 | Garbers | G06Q 10/02 705/5 |
| 2014/0343891 A1* | 11/2014 | Becker | G08G 1/147 702/150 |
| 2018/0240337 A1* | 8/2018 | Moran | G08G 1/147 |

FOREIGN PATENT DOCUMENTS

| CN | 2731611 | 10/2005 |
| CN | 107730995 | 2/2018 |
| JP | 49-125686 | 10/1974 |

(Continued)

OTHER PUBLICATIONS

Supplementary European Search Report and the European Search Opinion dated May 31, 2023 From the European Patent Office Re. Application No. 20822387.5. (11 Pages).

*Primary Examiner* — John F Mortell

(57) ABSTRACT

Parking detection sensor (100) has a Doppler sensor (110), a magnetic sensor (120) that detects magnetism on XYZ axes, a change point detection unit (130) that detects a change point in the output of the Doppler sensor (110) and the magnetic sensor (120), a level difference detection unit (140) that detects the magnetic level difference over time in the output of the Doppler sensor (110) and the magnetic sensor (120), and a state assessment unit (150) that assesses the parking state of a vehicle on the basis of the detection results of the change point detection unit (130) and the detection results of the level difference detection unit (140).

7 Claims, 17 Drawing Sheets

(56) References Cited

FOREIGN PATENT DOCUMENTS

| | | |
|---|---|---|
| JP | 2004-116173 | 4/2004 |
| JP | 2007-024709 | 2/2007 |
| JP | 2018-146560 | 9/2018 |
| KR | 10-2018-0104222 | 9/2018 |
| WO | WO 2009/060651 | 5/2009 |

\* cited by examiner

PARKING DETECTION SENSOR AND PARKING DETECTION METHOD

TECHNICAL FIELD

The present invention relates to a parking detection sensor and a parking detection method that detect that a vehicle has been parked at a predetermined parking position in a parking area, for example.

BACKGROUND ART

In the related art, there is a parking sensor as an apparatus that detects the presence of a vehicle entering and leaving a parking lot. For example, Patent Literature (hereinafter referred to as "PTL") 1 describes an apparatus that detects whether each parking lot in which a magnetic sensor is embedded is in a vacant state or in a parking state based on a change in magnetism between during vacancy and during parking. Further, PTL 1 describes that detection less susceptible to the surrounding environment and with high accuracy is possible by employing a hybrid system in which an infrared distance sensor and a magnetic sensor are used.

CITATION LIST

Patent Literature

PTL 1

Japanese Patent Application Laid-Open No. 2018-146560

SUMMARY OF INVENTION

Technical Problem

Incidentally, in parking detection using a magnetic sensor, data of three axes (X, Y and Z axes) of the magnetic sensor is used. However, reactions will also appear in data of the X and Y axes when a vehicle enters a parking lot adjacent to a parking lot in which the magnetic sensor is installed so that the parking in the adjacent parking lot may be erroneously detected as parking in the parking lot in which the magnetic sensor is installed.

Further, although PTL 1 proposes employing the hybrid system in which the infrared distance sensor and the magnetic sensor are used, PTL 1 does not sufficiently examine how to use measurement data of the infrared distance sensor and the magnetic sensor for performing parking determination. In addition, the infrared distance sensor utilizes light, and is therefore susceptible to stains and is not suitable for long-term installation in a parking area.

The present invention has been made in view of the points described above and provides a parking detection sensor and a parking detection method that are capable of improving the reliability of parking detection.

Solution to Problem

One aspect of a parking detection sensor of the present invention includes:
a Doppler sensor;
a magnetic sensor that detects magnetism on a Z axis toward a vehicle;
a change point detection section that detects a change point in output of the Doppler sensor and output of the magnetic sensor;
a level difference detection section that detects a level difference over time in the output of the Doppler sensor and the output of the magnetic sensor; and
a state determination section that determines a parking state of the vehicle based on a detection result of the change point detection section and a detection result of the level difference detection section.

One aspect of a parking detection method of the present invention includes:
acquiring a Doppler sensor signal from a Doppler sensor;
acquiring a magnetic sensor signal from a magnetic sensor that detects magnetism on a Z axis toward a vehicle; and
determining whether the vehicle has been parked by using a fluctuation in the Doppler sensor signal and a fluctuation in a Z-axis signal of the magnetic sensor signal.

Advantageous Effects of Invention

According to the present invention, it is possible to improve the reliability of parking detection.

BRIEF DESCRIPTION OF DRAWINGS

FIGS. 9A to 9C illustrate examples of data when a vehicle enters and leaves a parking lot in which the parking detection sensor is installed, in which FIG. 9A illustrates output data of a magnetic sensor and output data of a Doppler sensor, FIG. 9B illustrates a sample sum of XYZ fluctuations, a sample sum of Z fluctuations, a sample sum of IQ fluctuations, and threshold values (dotted lines), and FIG. 9C illustrates an XYZ level difference during vacancy, an XYZ level difference during stop, an IQ level difference during vacancy, and threshold values (dotted lines);

FIGS. 10A to 10C illustrate examples of data when a vehicle has been parked in a parking lot adjacent to a parking lot in which the parking detection sensor is installed, in which FIG. 10A illustrates output data of the magnetic sensor and output data of the Doppler sensor, FIG. 10B illustrates a sample sum of XYZ fluctuations, a sample sum of Z fluctuations, a sample sum of IQ fluctuations, and threshold values (dotted lines), and FIG. 10C illustrates an XYZ level difference during vacancy, an XYZ level difference during stop, an IQ level difference during vacancy, and threshold values (dotted lines);

FIGS. 11A to 11C illustrate examples of data when a vehicle passes through a parking lot in which the parking detection sensor is installed, in which FIG. 11A illustrates output data of the magnetic sensor and output data of the Doppler sensor, FIG. 11B illustrates a sample sum of XYZ fluctuations, a sample sum of Z fluctuations, a sample sum of IQ fluctuations, and threshold values (dotted lines), and FIG. 11C illustrates an XYZ level difference during vacancy, an XYZ level difference during stop, an IQ level difference during vacancy, and threshold values (dotted lines);

FIGS. 12A to 12C illustrate examples of data when there is no reaction from the Doppler sensor and there is a reaction from the magnetic sensor, in which FIG. 12A illustrates output data of the magnetic sensor and output data of the Doppler sensor, FIG. 12B illustrates a sample sum of XYZ fluctuations, a sample sum of Z fluctuations, a sample sum of IQ fluctuations, and threshold values (dotted lines), and FIG. 12C illustrates an XYZ level difference during vacancy, an XYZ level difference during stop, an IQ level difference during vacancy, and threshold values (dotted lines);

FIGS. 13A to 13C illustrate examples of data when there is no reaction from the magnetic sensor and there is a reaction from the Doppler sensor, in which FIG. 13A illustrates output data of the magnetic sensor and output data of the Doppler sensor, FIG. 13B illustrates a sample sum of XYZ fluctuations, a sample sum of Z fluctuations, a sample sum of IQ fluctuations, and threshold values (dotted lines), and FIG. 13C illustrates an XYZ level difference during vacancy, an XYZ level difference during stop, an IQ level difference during vacancy, and threshold values (dotted lines);

DESCRIPTION OF EMBODIMENTS

Figure 1:
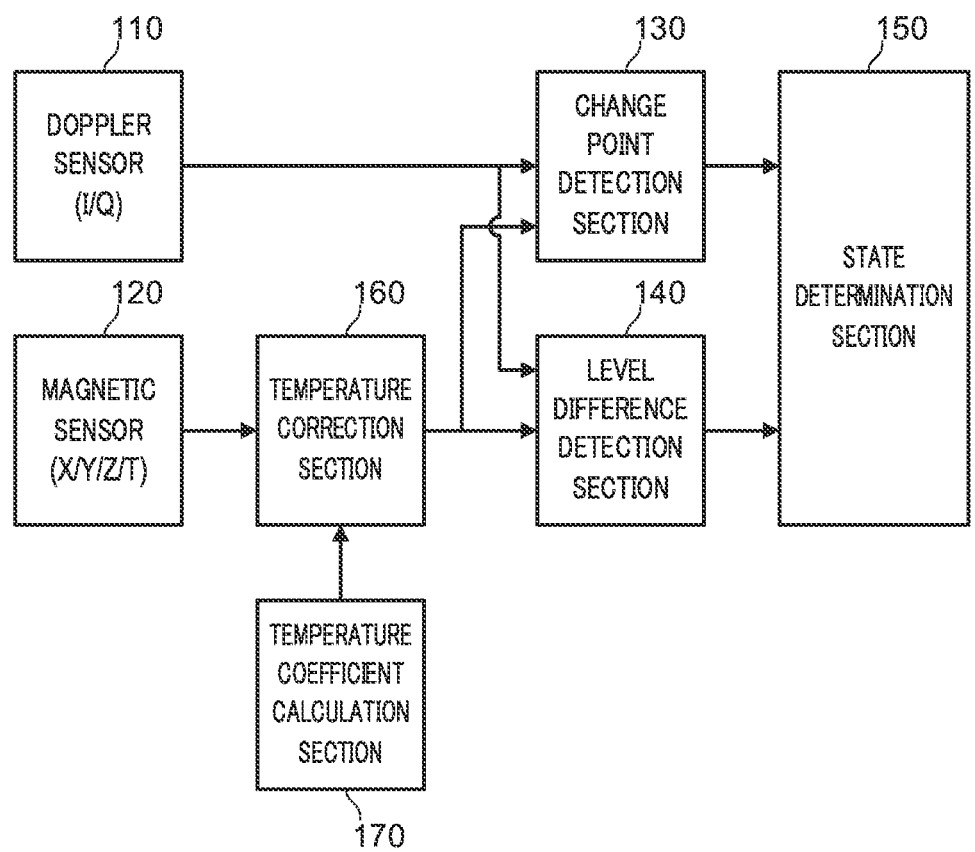
FIG. 1 is a block diagram illustrating a basic configuration of a parking detection sensor according to an embodiment.

First, before describing the configuration of the embodiment, it will be described how the present inventor has achieved the present invention.

In a case where parking is detected using a magnetic sensor, output data of the magnetic sensor represents data of output of three axes (X, Y and Z axes). Among them, a reaction in the Z-axis output is large when a vehicle moves just above the sensor, and a reaction to a parking lot adjacent to a parking lot in which the magnetic sensor is installed is weak. Accordingly, looking at only a change in the Z-axis output of the magnetic sensor makes it possible to reduce the probability that the magnetic sensor will erroneously detect a vehicle parked in a parking lot adjacent to a parking lot in which the magnetic sensor is installed.

To determine whether a vehicle has stopped, it is necessary to detect whether the value of magnetism has changed from its value in a vacant state. However, the value of magnetism depends on a stop position, and there is also a stop position at which the value of magnetism is almost unchanged from that in a vacant state. Accordingly, only with the Z-axis output, the magnetic sensor highly likely makes erroneous determination of whether the vehicle has stopped in a parking lot or passed therethrough so that determination of whether the vehicle has stopped is more preferably performed by incorporating the X-axis output and the Y-axis output as well.

Further, the reliability of determination is improved by using a Doppler sensor in combination with a magnetic sensor. That is, it is possible to prevent a detection omission by using a Doppler sensor in combination with a magnetic sensor even under a situation in which detection is impossible only with the magnetic sensor. For example, when the bottom surface of a vehicle is made of metal, there are few detection omissions due to a magnetic sensor. In a case where the bottom surface of a vehicle is coated with resin or the like, however, the reaction from a magnetic sensor becomes weak and a detection omission may occur. Even in such a situation, a detection omission can be prevented when a Doppler sensor is used in combination with a magnetic sensor.

Further, when only a Doppler sensor is used, the Doppler sensor reacts to unevenness of the bottom surface of a vehicle or to a pitch of a vehicle in an up-down direction and erroneous detection may occur. Even in such a situation, it is possible to prevent erroneous detection by using a magnetic sensor in combination with the Doppler sensor.

That is, in the present embodiment, the reliability of parking detection is improved by using a Doppler sensor and a magnetic sensor in combination and constructing an algorithm in which even when a detection omission or erroneous detection occurs in one of the Doppler sensor and the magnetic sensor, another thereof compensates for the detection omission or the erroneous detection.

Note that, sensor signals utilized in the present embodiment are data of I and Q signals of a Doppler sensor, and X, Y and Z signals and temperature T of a magnetic sensor. The present embodiment makes it easy to capture fluctuations in signals by acquiring data of these six signals at the interval of one second, for example. Note that, although it is possible to further reduce the probability of erroneous detection by using the X, Y and Z signals of the magnetic sensor as described above, even use of only a signal of the Z axis of the magnetic sensor also makes it possible to reduce the probability of erroneous detection in comparison with the prior art.

Hereinafter, an embodiment of the present invention will be described with reference to the accompanying drawings.

<1> Basic Configuration

FIG. 1 is a block diagram illustrating a basic configuration of parking detection sensor 100 according to the embodiment. Parking detection sensor 100 is installed, for example, on the ground of each parking lot of a parking area or in the floor or ceiling of each parking lot of a parking area.

Parking detection sensor 100 includes Doppler sensor 110 and magnetic sensor 120. In the example of the present embodiment, Doppler sensor 110 outputs I and Q signals at the interval of one second, and magnetic sensor 120 outputs X, Y and Z signals of three axes thereof and temperature signals T at the interval of one second. The configurations of Doppler sensor 110 and magnetic sensor 120 will be described later.

In addition, parking detection sensor 100 includes change point detection section 130, level difference detection section 140, and state determination section 150. Further, parking detection sensor 100 includes temperature correction section 160 and temperature coefficient calculation section 170.

I and Q signals which are sensing results of Doppler sensor 110 are inputted into change point detection section 130 and level difference detection section 140. X, Y and Z signals and T (temperature) signal which are sensing results of magnetic sensor 120 are inputted into change point detection section 130 and level difference detection section 140 via temperature correction section 160. Detection results of change point detection section 130 and level difference detection section 140 are inputted into state determination section 150. State determination section 150 determines the state of a vehicle, such as whether the vehicle is parked in a parking lot, based on the detection results of change point detection section 130 and level difference detection section 140.

Figure 2:
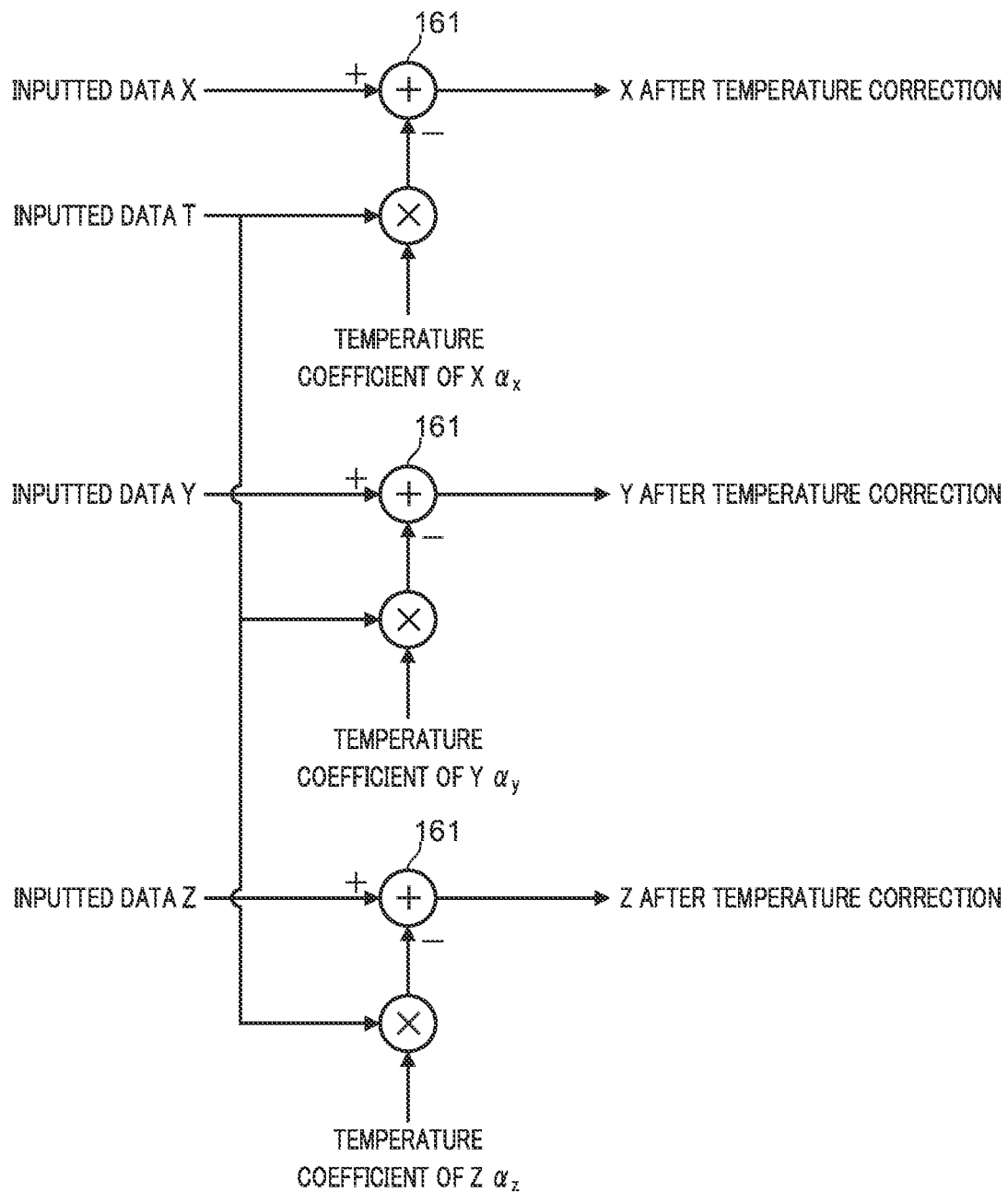
FIG. 2 is a block diagram illustrating a configuration example of a temperature correction section.

FIG. 2 is a block diagram illustrating a configuration example of temperature correction section 160. X, Y and Z signals from magnetic sensor 120 are inputted into adders 161, respectively. Temperature T of magnetic sensor 120, on the other hand, is multiplied by temperature coefficients $\alpha x$, $\alpha y$ and $\alpha z$ of X, Y and Z calculated in advance by temperature coefficient calculation section 170 (FIG. 1), respectively, and the products are inputted to adders 161, respectively. As a result, X, Y and Z signals after temperature correction are outputted from adders 161, respectively.

Figure 3:
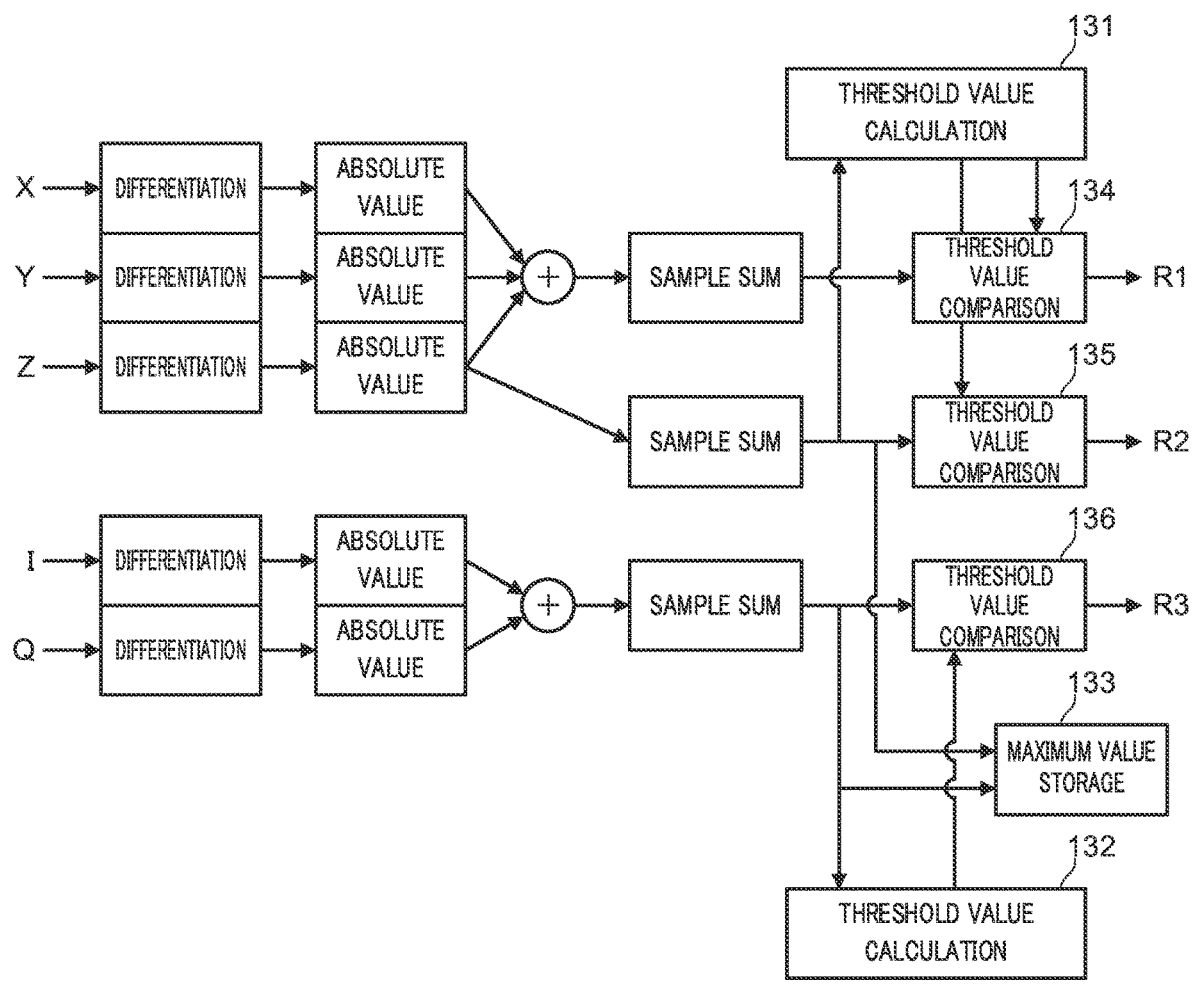
FIG. 3 is a block diagram illustrating a configuration example of a change point detection section.

FIG. 3 is a block diagram illustrating a configuration example of change point detection section 130. Change point detection section 130 performs the following processing to find a point where sensor output rapidly changes.

Five signals, which are I and Q signals of Doppler sensor 110 and X, Y and Z signals of magnetic sensor 120 after temperature correction, are subjected to differentiation processing using differentiation filters. In the case of the present embodiment, as the differentiation filters, FIR filters with filter coefficients of 0.5 and −0.5 are applied to I and Q signals of Doppler sensor 110, and FIR filters with filter coefficients of 0.25, 0.25, −0.25 and −0.25 are applied to X, Y and Z signals of magnetic sensor 120.

Since directions of changes are not utilized, absolute values of differentiation filter output are determined and information on only absolute values of changes is calculated.

With respect to output of magnetic sensor 120, absolute values (X, Y and Z) of differentiation filter output are summed up. Further, with respect to Z alone, an absolute value of differentiation filter output is taken out. With respect to output of Doppler sensor 110, absolute values (I and Q) of differentiation filter output are summed up.

Next, it is configured such that peaks of change points are easily found by taking sample sums. In the example of the present embodiment, each sample sum is generated by taking the sum of 10 samples. This processing can be performed, for example, by setting the coefficient of a FIR filter with a degree of 10 to be 1.

Next, sample sum output is compared with a predetermined threshold value. In a case where the sample sum output exceeds the threshold value, it is determined that there is a change, and this determination result is outputted to state determination section 150. State determination section 150 is, for example, a state machine, and executes an algorithm to be described later.

Further, change point detection section 130 includes threshold value calculation section 131 and threshold value calculation section 132. Threshold value calculation section 131 calculates, based on Z-axis output of magnetic sensor 120, a threshold value for detecting a change in magnetism. Threshold value calculation section 132 calculates, based on I and Q output of Doppler sensor 110, a threshold value for calculating a Doppler change.

Further, change point detection section 130 includes maximum value storage section 133. Maximum value storage section 133 stores a maximum value of Z-axis output of magnetic sensor 120 and maximum values of I and Q output of Doppler sensor 110. Values stored in maximum value storage section 133 are used as a measure for the reliability of a determination result.

Threshold value comparison section 134 compares a sum signal of X, Y and Z signals of magnetic sensor 120 with a threshold value, and outputs comparison result signal R1. Threshold value comparison section 135 compares a Z signal of magnetic sensor 120 with a threshold value, and outputs comparison result signal R2. Threshold value comparison section 136 compares I and Q signals of Doppler sensor 110 with a threshold value, and outputs comparison result signal R3.

Figure 4:
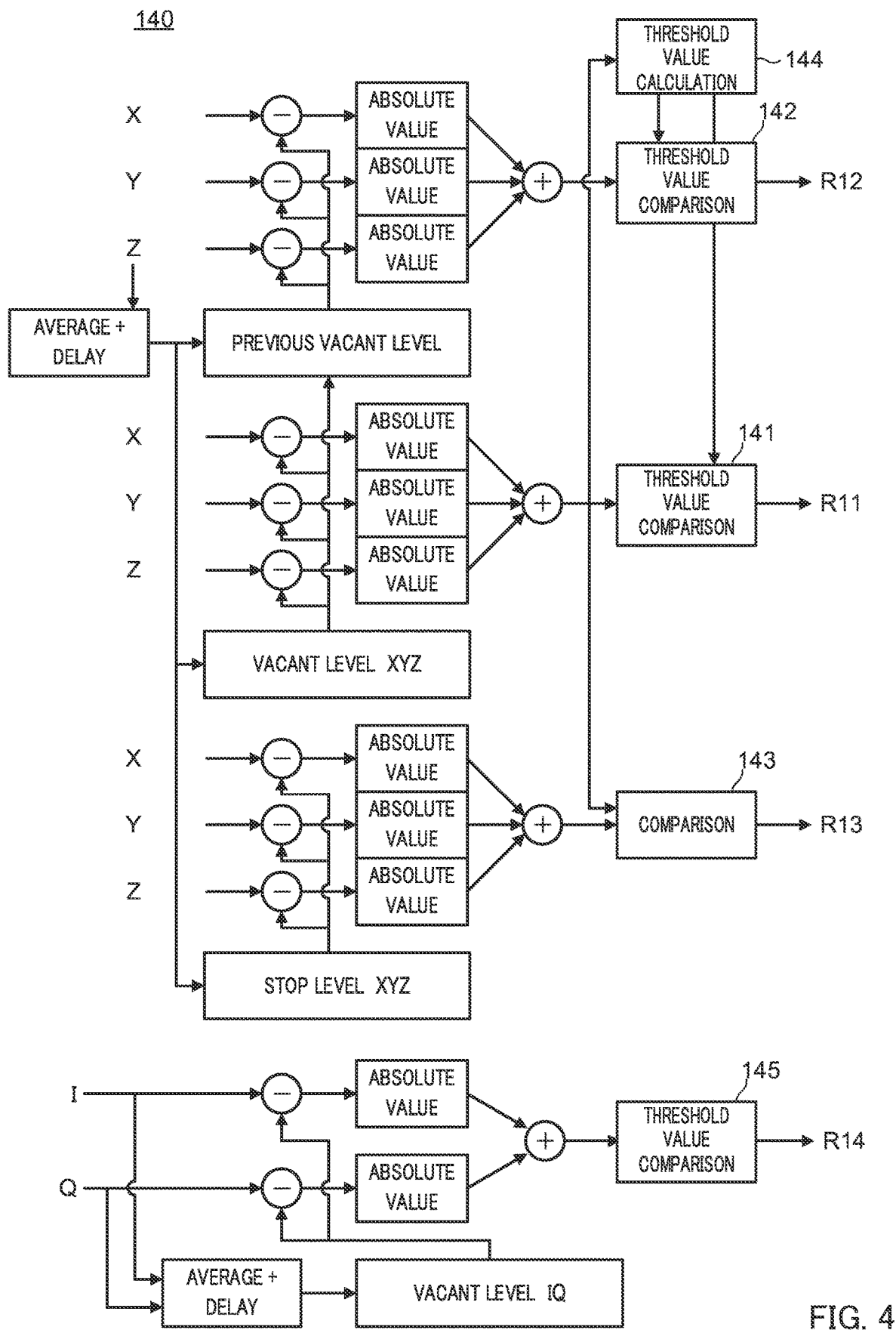
FIG. 4 is a block diagram illustrating a configuration example of a level difference detection section.

FIG. 4 is a block diagram illustrating a configuration example of level difference detection section 140.

Merely a change in sensor output of magnetic sensor 120 does not clarify whether a vehicle has actually stopped in a parking lot or has only passed therethrough. Accordingly, level difference detection section 140 compares an output level of magnetic sensor 120 before a change point and an output level of magnetic sensor 120 after the change point, and determines whether there is a difference therebetween. Further, level difference detection section 140 comparing an output level of Doppler sensor 110 during vacancy and an output level of Doppler sensor 110 at a current time, and determines whether there is a difference therebetween.

Level difference detection section 140 acquires magnetic levels for use in comparison as follows.

As magnetic levels to be compared, magnetic levels of the X, Y and Z axes for each of three levels of "vacant level (that is, a magnetic level in a vacant state)", "previous vacant level", and "stop level (that is, a magnetic level in a stop state)" are held. The held values thereof are updated with averaged values of inputted data (each data of X, Y and Z), respectively. In the example of the present embodiment, the averaging is performed by calculating a moving average with 10 filters having a filter coefficient of 0.1, which are arranged and have a length of 10 in total. Further, in order to cause delay by 4 samples for adaptation to the differentiation filters used for the change point detection in magnetic sensor 120, FIR filters in which four zeros are added to the filter coefficient such that the FIR filters have a length of 14 in total are applied.

In a vacant state, state determination section (state machine) 150 updates the held values of the "vacant level" to output values of the average+delay filter described above. In a stop state, state determination section (state machine) 150 updates the held values of the "stop level" to output values of the average+delay filter described above.

On the other hand, the held values of the "previous vacant level" copy the held values of the "vacant level" when the state transitions from a state, which has changed from a vacant state and in which a change in X, Y and Z signals of magnetic sensor 120 is detected, to a vacant state, and when the state transitions from a state, which has changed from a stop state and in which a change in X, Y and Z signals of magnetic sensor 120 is detected, to a vacant state. Further, the held values of the "previous vacant level" copy and hold output values of the average+delay filter described above when the state transitions from a state, which has changed from a vacant state and in which a change in I and Q signals of Doppler sensor 110 or in a Z-axis signal of magnetic sensor 120 is detected, to a vacant state, and when the state transitions from a state, which has changed from a stop state and in which a change in I and Q signals of Doppler sensor 110 or in a Z-axis signal of magnetic sensor 120 is detected, to a vacant state.

Comparison between held values of a magnetic level and current values thereof is performed as follows.

Vacant Level Comparison: absolute values of differences between held values of X, Y and Z in a vacant state and current values of X, Y and Z are totaled. Threshold value comparison section 141 compares this totaled value with a threshold value calculated by threshold value calculation section 144, and outputs, as comparison result signal R11, 1 in a case where the totaled value is larger than the threshold value, or 0 in a case where the totaled value is equal to or less than the threshold value.

Previous Vacant Level Comparison: absolute values of differences between held values of X, Y and Z in a previous vacant state and current values of X, Y and Z are totaled. Threshold value comparison section 142 compares this totaled value with a threshold value calculated by threshold value calculation section 144, and outputs, as comparison result signal R12, 1 in a case where the totaled value is larger than the threshold value, or 0 in a case where the totaled value is equal to or less than the threshold value.

Stop Level Comparison: absolute values of differences between held values of X, Y and Z in a stop state and current values of X, Y and Z are totaled. Comparison section 143 compares this totaled value with a totaled value of a vacant level, and outputs comparison result signal R13. Specifically, comparison section 143 outputs 1 in a case where the totaled value of the stop level is larger than the totaled value of the vacant level (in other words, in a case where the current value is closer to that of the vacant level than that of the stop level), and 0 in a case where the totaled value of the stop level is equal to or less than the totaled value of the vacant level (in other words, when the current value is closer to that of the stop level than that of the vacant level).

Level difference detection section 140 also performs the same processing to I and Q signals obtained by Doppler sensor 110. That is, when a value obtained by totaling absolute values of differences between values of I and Q in a vacant state and current values of I and Q is inputted, threshold value comparison section 145 compares this totaled value with a predetermined threshold value, and outputs, as comparison result signal R14, 1 in a case where the totaled value is larger than the threshold value, or 0 in a case where the totaled value is equal to or less than the threshold value.

Next, threshold values used in the present embodiment will be described. As described above, change point detection section 130 includes threshold value calculation sections 131 and 132, and level difference detection section 140 includes threshold value calculation section 144. Threshold value calculation section 131 calculates threshold values for detecting a change point in the magnetic Z axis and change points in the magnetic X, Y and Z axes. Threshold value calculation section 132 calculates a threshold value for detecting a Doppler change point. Threshold value calculation section 144 calculates a threshold value for comparing vacant levels.

Threshold values calculated by threshold value calculation sections 131 and 132 are updated when a determination result of state determination section 150 does not change from a vacant state or a stop state. On the other hand, a threshold value calculated by threshold value calculation section 144 is updated when a determination result of state determination section 150 does not change from a vacant state.

Figure 5:
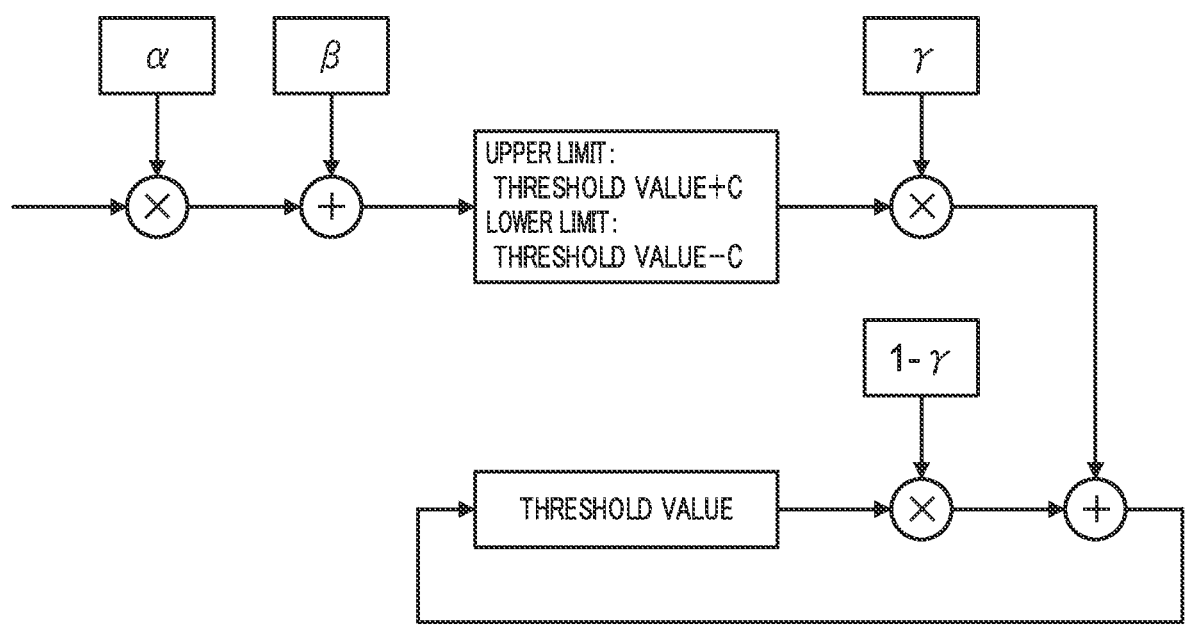
FIG. 5 illustrates a configuration example of a threshold value calculation section.

FIG. 5 illustrates a configuration example of threshold value calculation section 131, 132 or 144. In the configuration example of FIG. 5, a value to be compared with a threshold value is multiplied by coefficient α, offset β is added thereto, and then the value is clipped between an upper limit and a lower limit that are a current threshold value +C and the current threshold value −C, respectively. A value obtained by multiplying the above result by coefficient γ<1.0 and a result obtained by multiplying the current threshold value by 1−γ are summed up to set a new threshold value.

Figure 6:
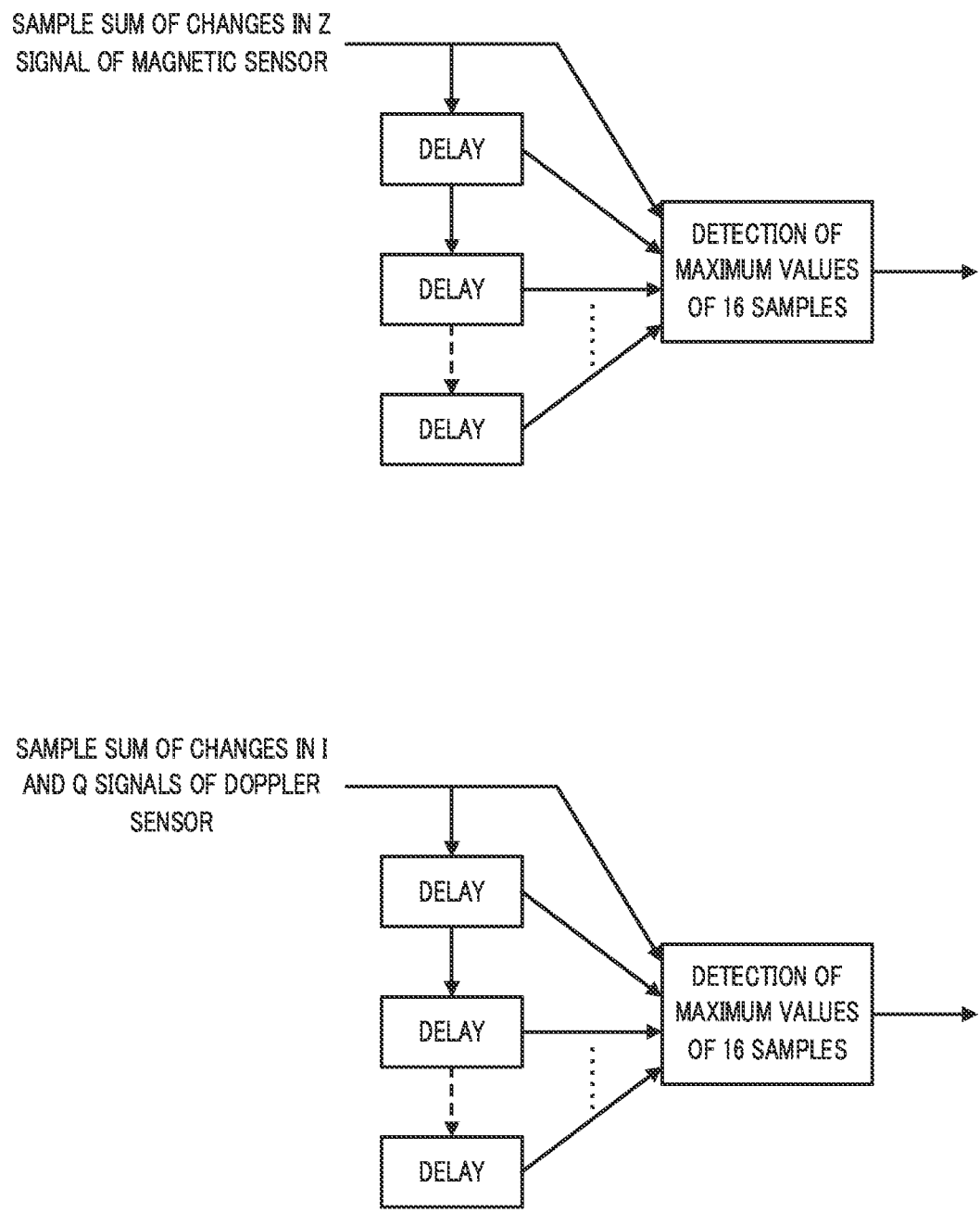
FIG. 6 illustrates a configuration example of a maximum value storage section.

FIG. 6 illustrates a configuration example of maximum value storage section 133 (FIG. 3). Maximum value storage section 133 in the example of FIG. 6 acquires maximum values of latest 16 samples. The reason why 16 samples are set is that since a calculation interval of the algorithm is one second and a packet transmission interval to a gateway (a parking management apparatus) (that is, a determination result transmission interval) is 16 seconds in the case of the present embodiment, it is configured such that maximum values between packet transmissions can be obtained at the gateway.

<2> Determination Processing by State Determination Section 150

Figure 7:
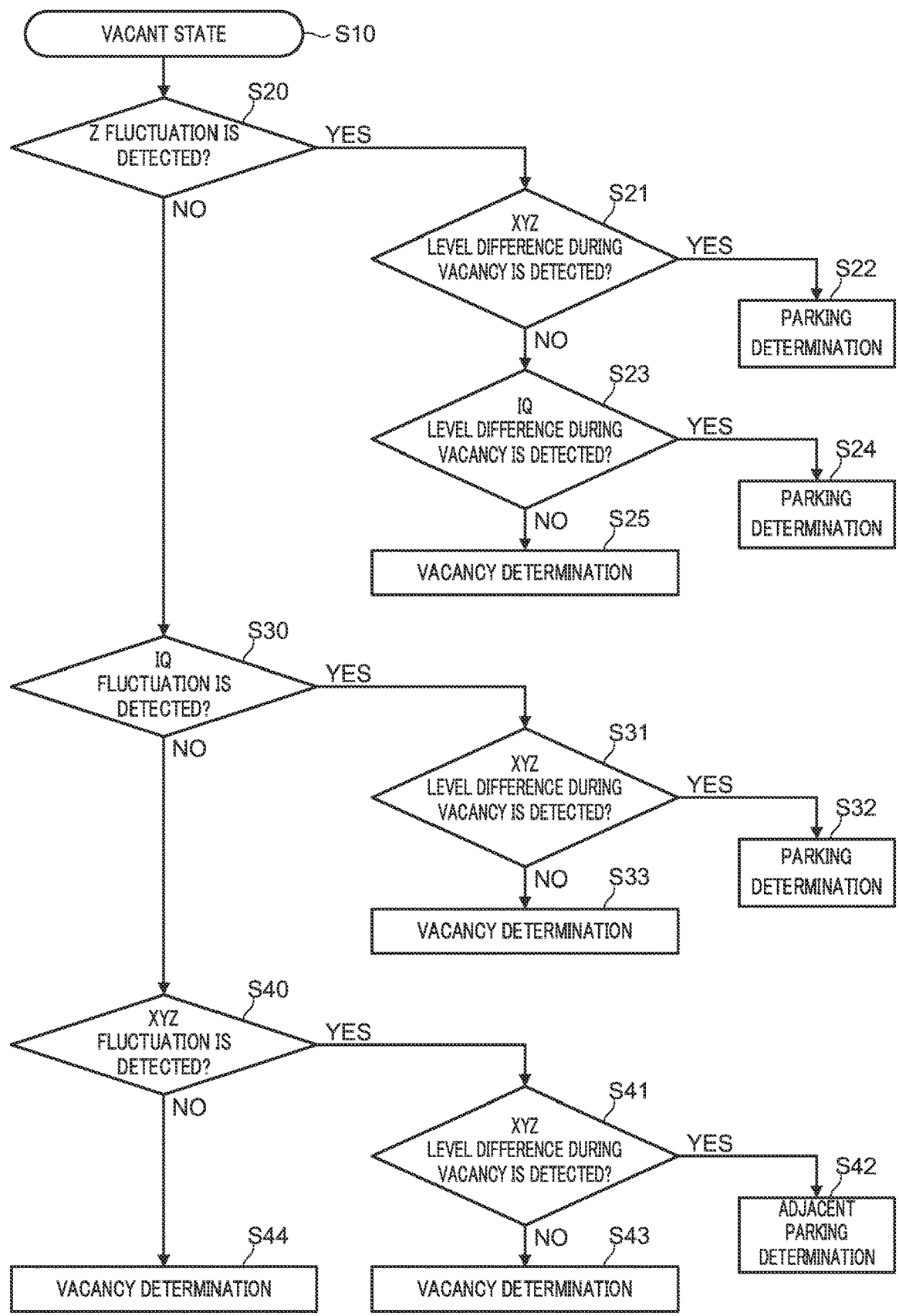
FIG. 7 is a flowchart in which a vacant state is a start of processing.
Figure 8:
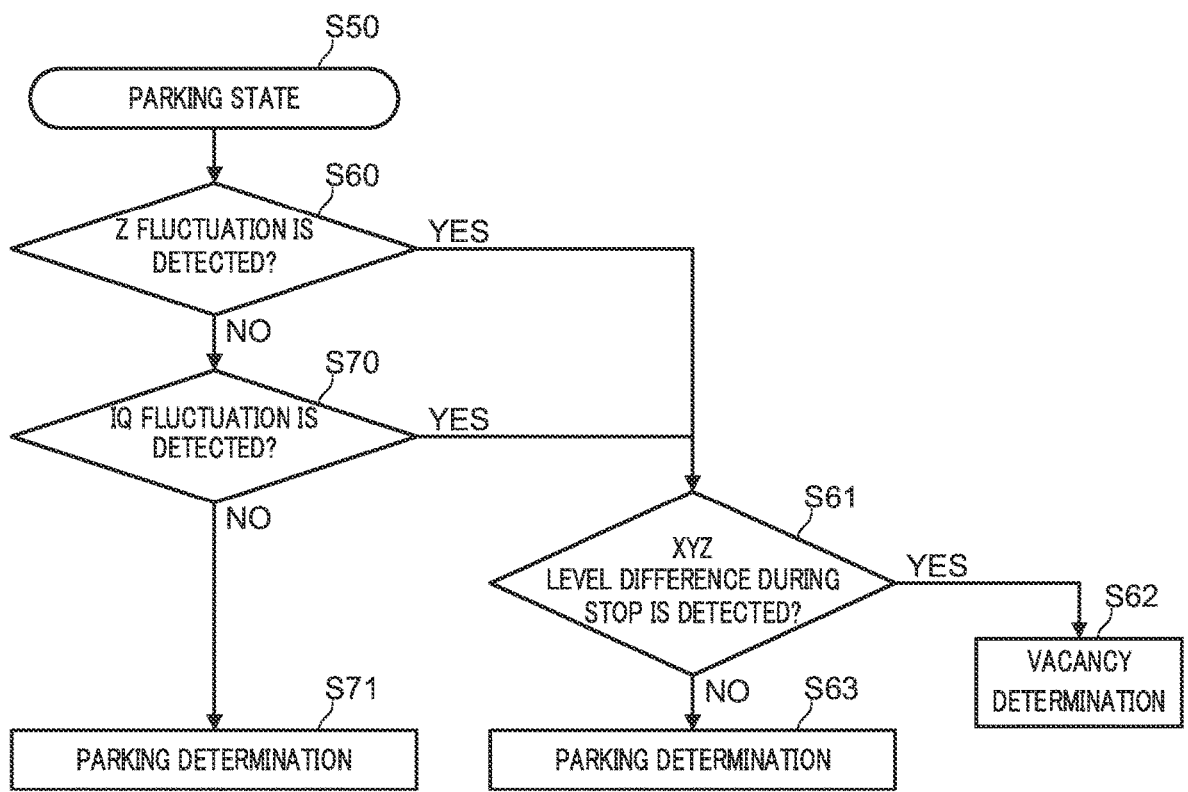
FIG. 8 is a flowchart in which a parking state is a start of processing.

FIGS. 7 and 8 are flowcharts illustrating determination procedures to be executed by state determination section 150. FIG. 7 is a flowchart in which a vacant state is a start of processing. FIG. 8 is a flowchart in which a parking state is a start of processing.

For example, it is obviously a vacant state when parking detection sensor 100 is installed in a parking area and the power supply of parking detection sensor 100 is turned on. Accordingly, when the power supply of parking detection sensor 100 is on, the processing starts in step S10 of FIG. 7. Further, in a case where parking detection sensor 100 performs vacancy determination, the next determination starts in step S10 in FIG. 7. In a case where parking detection sensor 100 performs parking determination, the next determination starts in step S50 in FIG. 8.

Further, in other words, the processing flow of FIG. 7 is mainly executed when it is detected whether a vehicle enters a parking lot in which parking detection sensor 100 is installed, and the processing flow of FIG. 8 is mainly executed when it is detected whether a vehicle leaves a parking lot in which parking detection sensor 100 is installed.

First, the processing flow of FIG. 7 will be described.

When state determination section 150 starts the processing in a vacant state in step S10, state determination section 150 determines in step S20 subsequent thereto whether a Z fluctuation has been detected based on comparison result R2 of threshold value comparison section 135. In a case where an affirmative result is obtained in step S20, state determination section 150 shifts the processing to step S21. In step S21, state determination section 150 determines whether an XYZ level difference during vacancy has been detected based on comparison result R11 of threshold value comparison section 141. In a case where an affirmative result is obtained in step S21, state determination section 150 shifts the processing to step S22, and performs parking determination. Here, the parking determination refers to a determination result indicating that a parked vehicle is present in a parking lot in which parking detection sensor 100 is installed.

In a case where a negative result is obtained in step S21, state determination section 150 shifts the processing to step S23. In step S23, state determination section 150 determines whether an IQ level difference during vacancy has been detected based on comparison result R14 of threshold value comparison section 145. In a case where an affirmative result is obtained in step S23, state determination section 150 shifts the processing to step S24, and performs parking determination. In a case where a negative result is obtained in step S23, state determination section 150 shifts the processing to step S25, and performs vacancy determination. Here, the vacancy determination refers to a determination result indicating that a parked vehicle is not present in a parking lot in which parking detection sensor 100 is installed.

Note that, when the processing flow has reached step S25 through steps S10-S20-S21-S23, it means that a vehicle has passed through a parking lot in which itself is installed. Accordingly, it may also be configured such that when the processing reaches step S25, state determination section 150 performs vacancy determination and performs passing-through determination.

When a negative result is obtained in step S20, state determination section 150 shifts the processing to step S30. In step S30, state determination section 150 determines whether an IQ fluctuation has been detected based on comparison result R3 of threshold value comparison section 136. When an affirmative result is obtained in step S30, state determination section 150 shifts the processing to step S31. In step S31, state determination section 150 determines whether an XYZ level difference during vacancy has been detected based on comparison result R11 of threshold value comparison section 141. In a case where an affirmative result is obtained in step S31, state determination section 150 shifts the processing to step S32, and performs parking determination.

When a negative result is obtained in step S30, state determination section 150 shifts the processing to step S40. In step S40, state determination section 150 determines whether an XYZ fluctuation has been detected based on comparison result R1 of threshold value comparison section 134. In a case where an affirmative result is obtained in step S40, state determination section 150 shifts the processing to step S41. In step S41, state determination section 150 determines whether an XYZ level difference during vacancy has been detected based on comparison result R11 of threshold value comparison section 141. In a case where an affirmative result is obtained in step S41, state determination section 150 shifts the processing to step S42, and performs adjacent parking determination. Here, the adjacent parking determination refers to a determination result indicating that a parked vehicle is present in a parking lot adjacent to a parking lot in which parking detection sensor 100 is installed. When a negative result is obtained in step S41, state determination section 150 shifts the processing to step S43, and performs vacancy determination.

Further, when a negative result is obtained in step S40, state determination section 150 shifts the processing to step S44, and performs vacancy determination.

Here, the processing flow illustrated in FIG. 7 has the following characteristics.

Even in a case where a fluctuation in the Z axis of magnetic sensor 120 has been detected during vacancy (step S20; YES), vacancy determination is performed when levels of I and Q of Doppler sensor 110 are close to levels of I and Q during vacancy (step S23; NO). Thus, a case where a vehicle simply "passes through" a parking lot in which parking detection sensor 100 is installed is not erroneously determined as "parking", but can be correctly determined as "vacancy".

Even in a case where a fluctuation in the Z axis of magnetic sensor 120 has not been detected during vacancy (step S20; NO), it is determined whether an IQ fluctuation in Doppler sensor 110 has been detected (step S30). Thus, even in a case where the output level of magnetic sensor 120 is generally low for a certain reason, that is, even in a case where determination is erroneously performed only with the output of magnetic sensor 120, it is possible to compensate for a determination error due to a low output level of magnetic sensor 120, based on a detection result of an IQ fluctuation in Doppler sensor 110.

Even in a case where neither a fluctuation in the Z axis of magnetic sensor 120 nor an IQ fluctuation in Doppler sensor 110 are detected during vacancy (step S20; NO and step S30; NO), it is determined whether an XYZ fluctuation in magnetic sensor 120 has been detected (step S40), and whether an XYZ fluctuation level difference during vacancy in magnetic sensor 120 is detected (step S41). Thus, it is possible to determine whether a vehicle is parked in a parking lot adjacent to a parking lot in which parking detection sensor 100 is installed.

Next, the processing flow of FIG. 8 will be described.

When state determination section 150 starts the processing in a parking state in step S50, state determination section 150 determines in step S60 subsequent thereto whether a Z fluctuation has been detected based on comparison result R2 of threshold value comparison section 135. In a case where an affirmative result is obtained in step S60, state determination section 150 shifts the processing to step S61. In step S61, state determination section 150 determines whether an XYZ level difference during stop has been detected based on comparison result R13 of the comparator unit 143. In a case where an affirmative result is obtained in step S61, state determination section 150 shifts the processing to step S62, and performs vacancy determination. In a case where a negative result is obtained in step S61, state determination section 150 shifts the processing to step S63, and performs parking determination.

In a case where a negative result is obtained in step S60, state determination section 150 shifts the processing to step S70. In step S70, state determination section 150 determines whether an IQ fluctuation has been detected based on comparison result R3 of threshold value comparison section 136. In a case where an affirmative result is obtained in step S70, state determination section 150 shifts the processing to step S61. In a case where a negative result is obtained in step S70, state determination section 150 shifts the processing to step S71, and performs parking determination.

Here, the processing flow illustrated in FIG. 8 has the following characteristics.

Even in a case where a fluctuation in the Z axis of magnetic sensor 120 has not been detected during vacancy (step S60; NO), it is determined whether an IQ fluctuation in Doppler sensor 110 has been detected (step S70). Thus, even in a case where the output level of magnetic sensor 120 is generally low for a certain reason, that is, even in a case where determination is erroneously performed only with the output of magnetic sensor 120, it is possible to compensate for a determination error due to a low output level of magnetic sensor 120, based on a detection result of an IQ fluctuation in Doppler sensor 110.

FIGS. 9 to 13 illustrate examples of data in parking detection sensor 100. The horizontal axis represents the time (seconds) and the vertical axis represents the signal level.

Figure 9A:
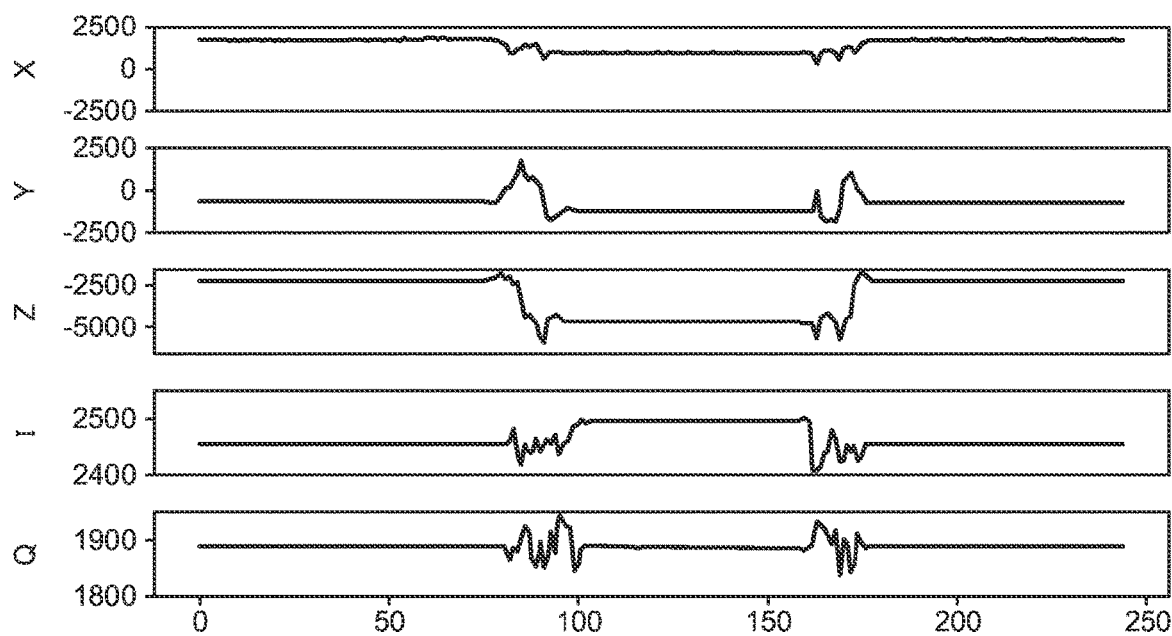
Figure 9B:
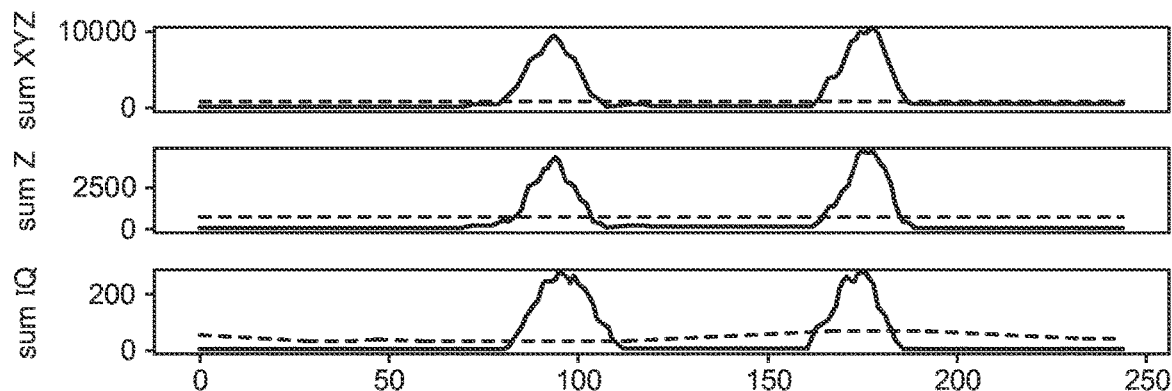
Figure 9C:
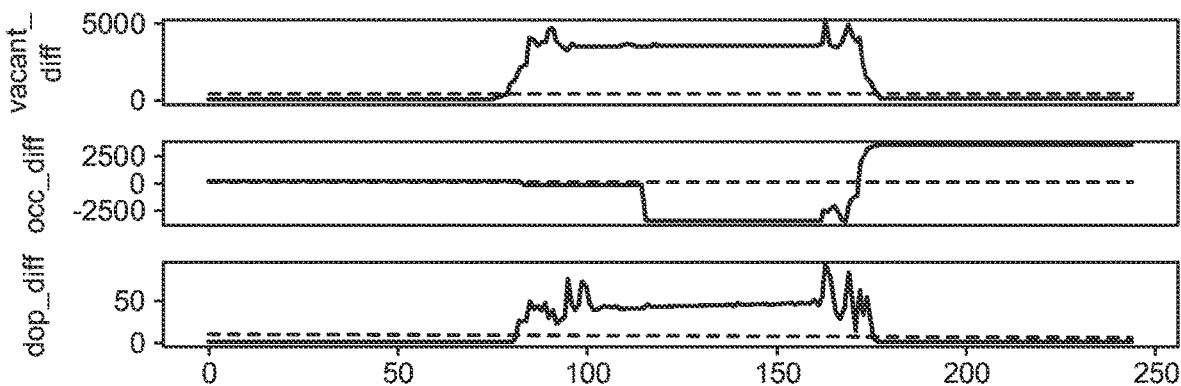

FIGS. 9A to 9C illustrate examples of data when a vehicle enters and leaves a parking lot in which parking detection sensor 100 is installed. FIG. 9A illustrates output data (X, Y, Z) of magnetic sensor 120 and output data (I, Q) of Doppler sensor 110. FIG. 9B illustrates a sample sum of XYZ fluctuations (sum XYZ), a sample sum of Z fluctuations (sum Z), a sample sum of IQ fluctuations (sum IQ), and threshold values (dotted lines). The sample sums and the threshold values are inputted into threshold value comparison sections 134, 135 and 136 of change point detection section 130, respectively. FIG. 9C illustrates an XYZ level difference during vacancy (vacant_diff), an XYZ level difference during stop (occ_diff), an IQ level difference during vacancy (dop IQ), and threshold values (dotted lines). The sample sums and the threshold values are inputted into threshold value comparison sections 141, 143 and 145 of level difference detection section 140, respectively.

With respect to the data as illustrated in FIGS. 9A to 9C, parking detection sensor 100 performs the processing in steps S10-S20-S21-S22 to obtain a determination result that a vehicle enters a parking lot in which parking detection sensor 100 itself is installed. Further, with respect to the data as illustrated in FIGS. 9A to 9C, parking detection sensor 100 performs the determinations in steps S50-S60-S61-S62 to obtain a determination result that a vehicle leaves a parking lot in which parking detection sensor 100 itself is installed.

Figure 10A:
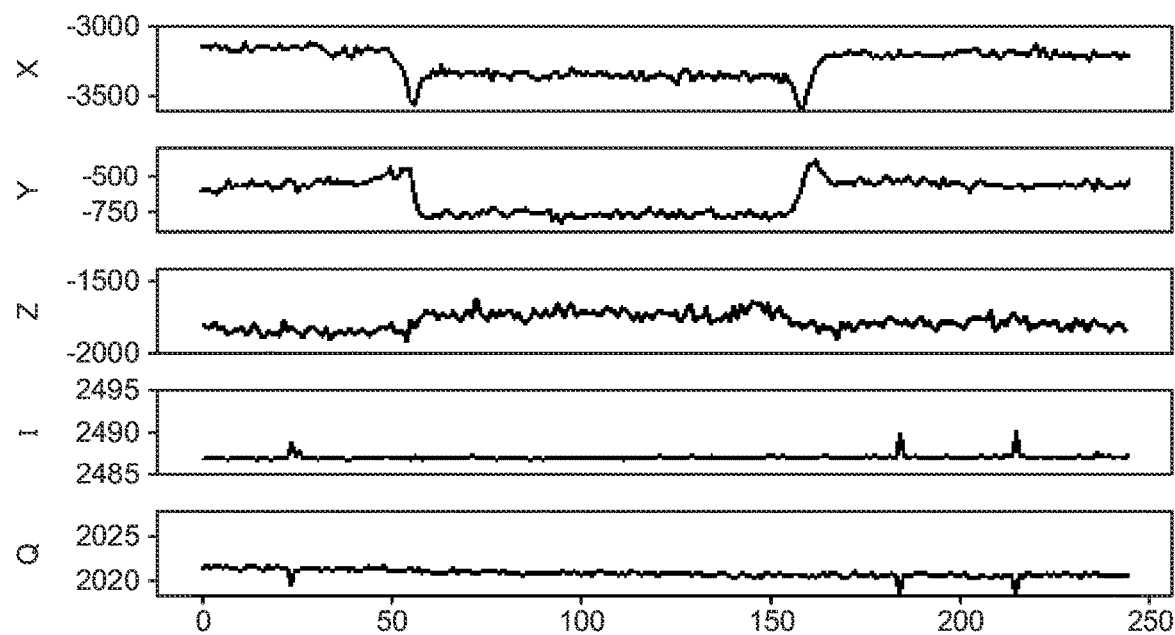
Figure 10B:
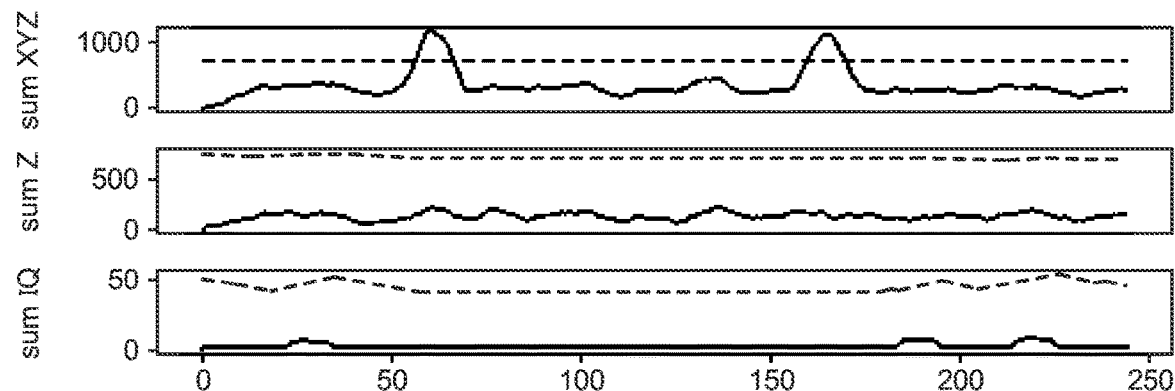
Figure 10C:
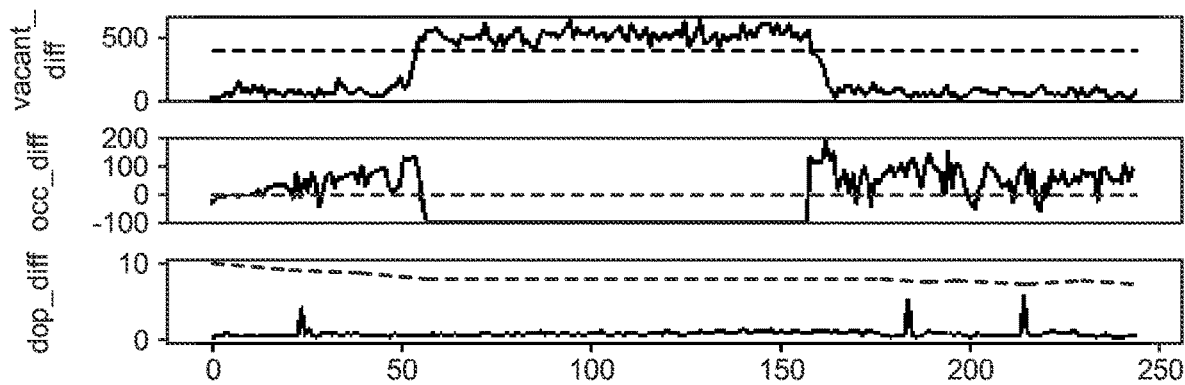

FIGS. 10A to 10C illustrate examples of data when a vehicle has been parked in a parking lot adjacent to a parking lot in which parking detection sensor 100 is installed. FIG. 10A illustrates output data (X, Y, Z) of magnetic sensor 120 and output data (I, Q) of Doppler sensor 110. FIG. 10B illustrates a sample sum of XYZ fluctuations (sum XYZ), a sample sum of Z fluctuations (sum Z), a sample sum of IQ fluctuations (sum IQ), and threshold values (dotted lines). The sample sums and the threshold values are inputted into threshold value comparison sections 134, 135 and 136 of change point detection section 130, respectively. FIG. 10C illustrates an XYZ level difference during vacancy (vacant_diff), an XYZ level difference during stop (occ_diff), an IQ level difference during vacancy (dop IQ), and threshold values (dotted lines). The sample sums and the threshold values are inputted into threshold value comparison sections 141, 143 and 145 of level difference detection section 140, respectively.

With respect to the data as illustrated in FIG. 10A to 10C, parking detection sensor 100 performs the determinations in steps S10 S20 S30 S40 S41 S42 to obtain a determination result that a vehicle has been parked in a parking lot adjacent to a parking lot in which parking detection sensor 100 itself is installed.

Figure 11A:
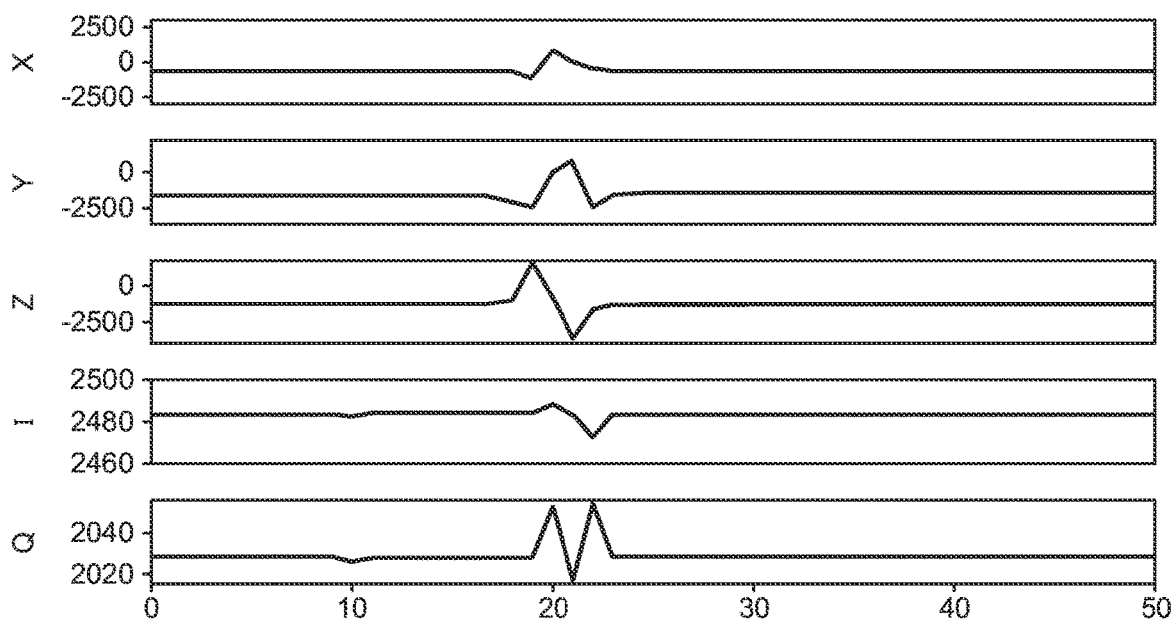
Figure 11B:
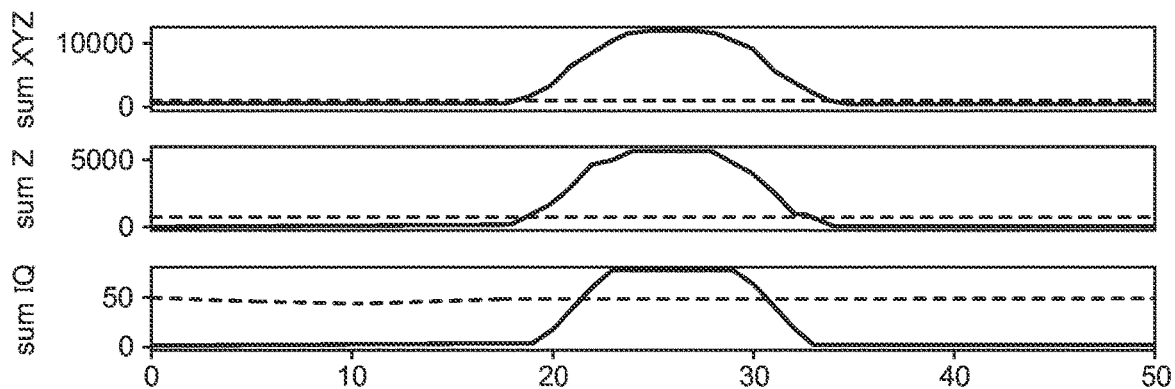
Figure 11C:
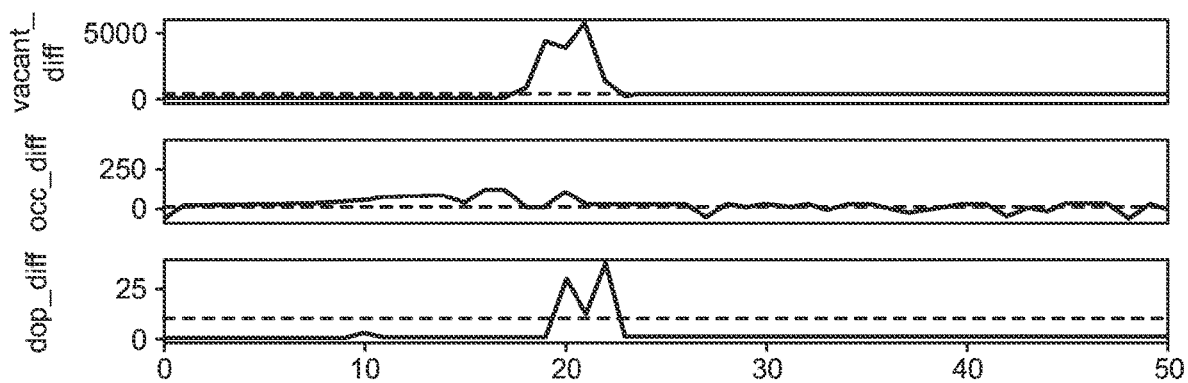

FIGS. 11A to 11C illustrate examples of data when a vehicle passes through a parking lot in which parking detection sensor 100 is installed. FIG. 11A illustrates output data (X, Y, Z) of magnetic sensor 120 and output data (I, Q) of Doppler sensor 110. FIG. 11B illustrates a sample sum of XYZ fluctuations (sum XYZ), a sample sum of Z fluctuations (sum Z), a sample sum of IQ fluctuations (sum IQ), and threshold values (dotted lines). The sample sums and the threshold values are inputted into threshold value comparison sections 134, 135 and 136 of change point detection section 130, respectively. FIG. 11C illustrates an XYZ level difference during vacancy (vacant_diff), an XYZ level difference during stop (occ_diff), an IQ level difference during vacancy (dop IQ), and threshold values (dotted lines). The sample sums and the threshold values are inputted into threshold value comparison sections 141, 143 and 145 of level difference detection section 140, respectively.

With respect to the data as illustrated in FIGS. 11A to 11C, parking detection sensor 100 performs the determinations in steps S10-S20-S21-S23-S25 to obtain a determination result that a vehicle passes through a parking lot in which parking detection sensor 100 itself is installed.

Figure 12A:
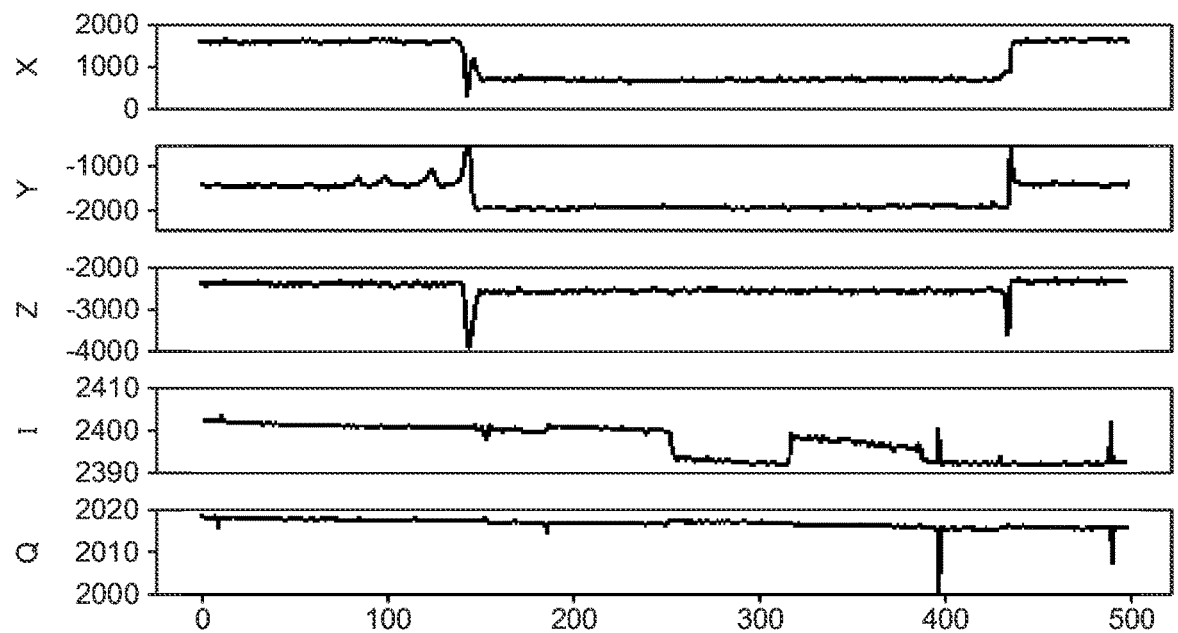
Figure 12B:
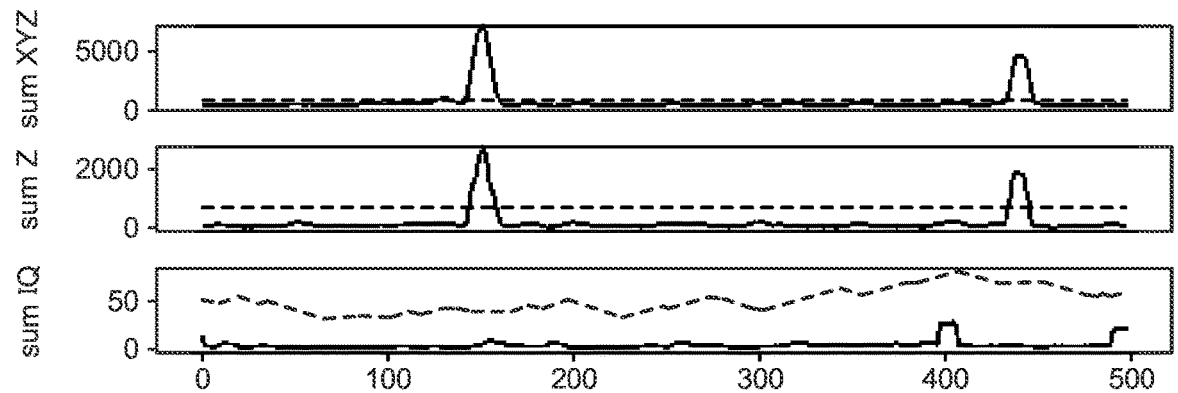
Figure 12C:
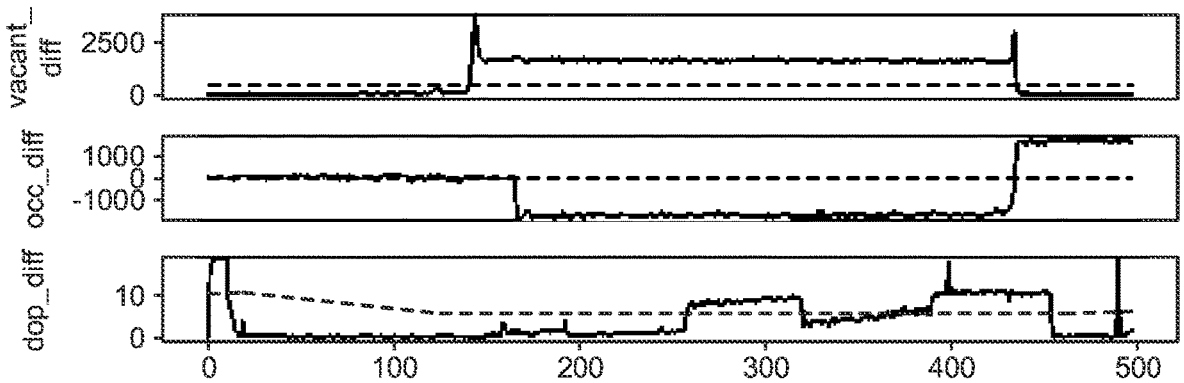

FIGS. 12A to 12C illustrate examples of data when there is no reaction from Doppler sensor 110 (that is, there is no IQ fluctuation) and there is a reaction from magnetic sensor 120 (specifically, there is a fluctuation in the Z axis). FIG. 12A illustrates output data (X, Y, Z) of magnetic sensor 120 and output data (I, Q) of Doppler sensor 110. FIG. 12B illustrates a sample sum of XYZ fluctuations (sum XYZ), a sample sum of Z fluctuations (sum Z), a sample sum of IQ fluctuations (sum IQ), and threshold values (dotted lines). The sample sums and the threshold values are inputted into threshold value comparison sections 134, 135 and 136 of change point detection section 130, respectively. FIG. 12C illustrates an XYZ level difference during vacancy (vacant_diff), an XYZ level difference during stop (occ_diff), an IQ level difference during vacancy (dop IQ), and threshold values (dotted lines). The sample sums and the threshold values are inputted into threshold value comparison sections 141, 143 and 145 of level difference detection section 140, respectively.

With respect to the data as illustrated in FIGS. 12A to 12C, parking detection sensor 100 performs the determinations in steps S10-S20-S21-S22 to obtain a determination result that a vehicle enters a parking lot in which parking detection sensor 100 itself is installed.

Figure 13A:
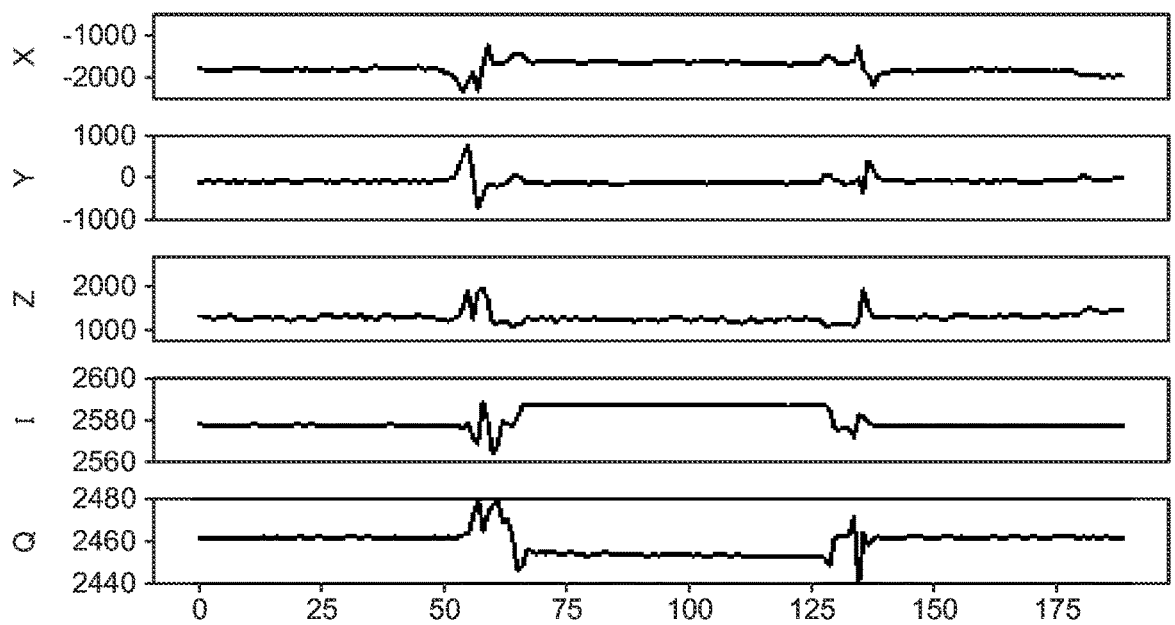
Figure 13B:
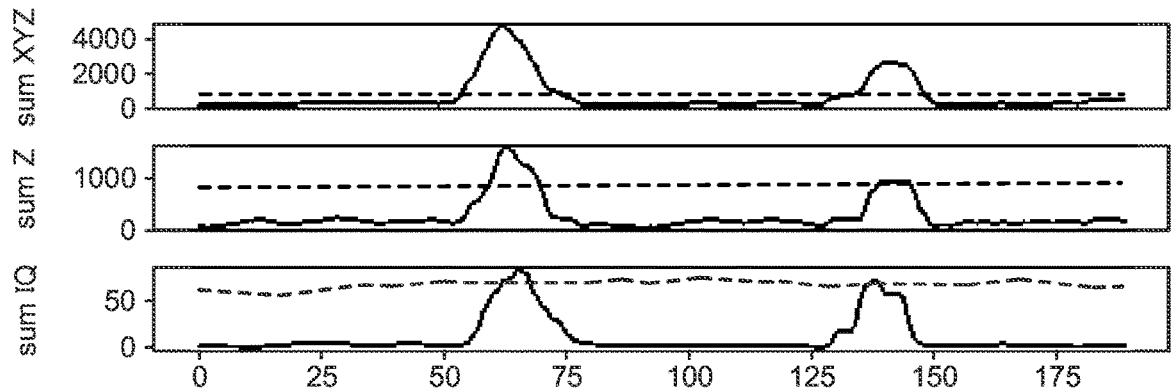
Figure 13C:
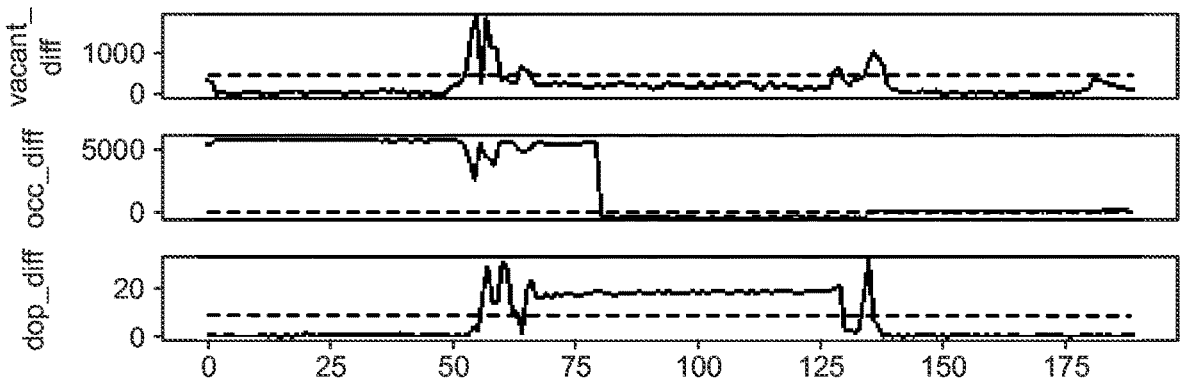

FIGS. 13A to 13C illustrate examples of data when there is no reaction from magnetic sensor 120 (specifically there is no XYZ difference during vacancy) and there is a reaction from Doppler sensor 110 (that is, there is an IQ fluctuation). FIG. 13A illustrates output data (X, Y, Z) of magnetic sensor 120 and output data (I, Q) of Doppler sensor 110. FIG. 13B illustrates a sample sum of XYZ fluctuations (sum XYZ), a sample sum of Z fluctuations (sum Z), a sample sum of IQ fluctuations (sum IQ), and threshold values (dotted lines). The sample sums and the threshold values are inputted into threshold value comparison sections 134, 135 and 136 of change point detection section 130, respectively. FIG. 13C illustrates an XYZ level difference during vacancy (vacant_diff), an XYZ level difference during stop (occ_diff), an IQ level difference during vacancy (dop IQ), and threshold values (dotted lines). The sample sums and the threshold values are inputted into threshold value comparison sections 141, 143 and 145 of level difference detection section 140, respectively.

With respect to the data as illustrated in FIGS. 13A to 13C, parking detection sensor 100 performs the determinations in steps S10-S20-S21-S23-S24 to obtain a determination that a vehicle enters a parking lot in which parking detection sensor 100 itself is installed.

<3> Structure of Parking Detection Sensor

Next, the structure of parking detection sensor 100 of the present embodiment will be described.

Figure 14:
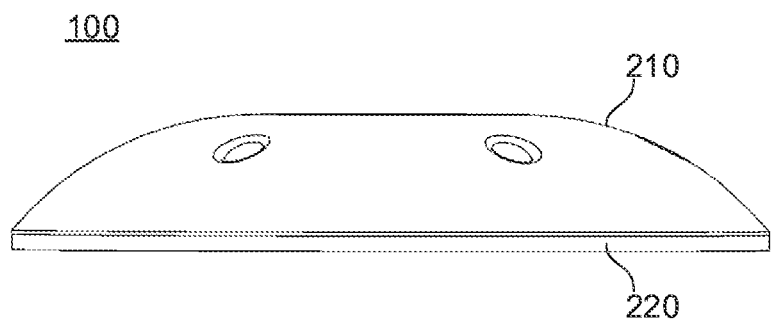
FIG. 14 is a side view of the parking detection sensor.
Figure 15:
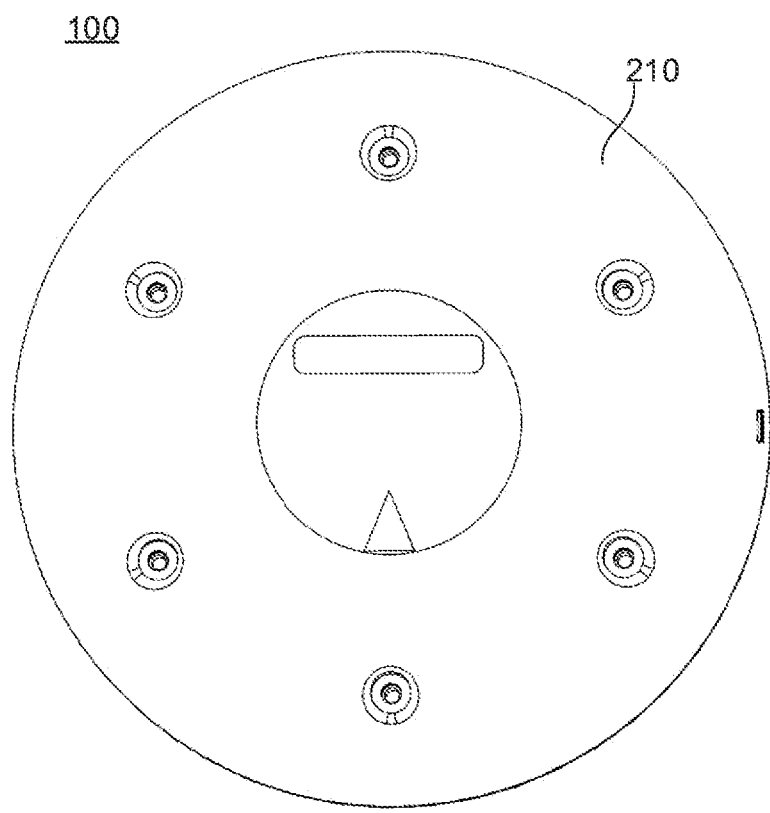
FIG. 15 is a top view of the parking detection sensor.
Figure 16:
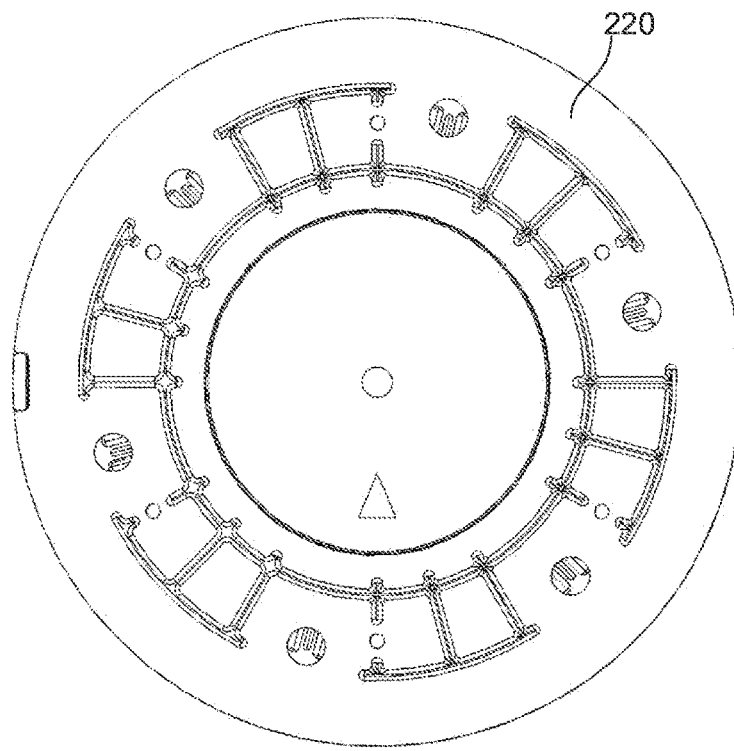
FIG. 16 is a bottom view of the parking detection sensor.

FIG. 14 is a side view of parking detection sensor 100. FIG. 15 is a top view of parking detection sensor 100. FIG. 16 is a bottom view of parking detection sensor 100. Parking detection sensor 100 includes an outer shell formed of upper case 210 having a dome shape and lower case 220 having a plate shape.

Figure 17:
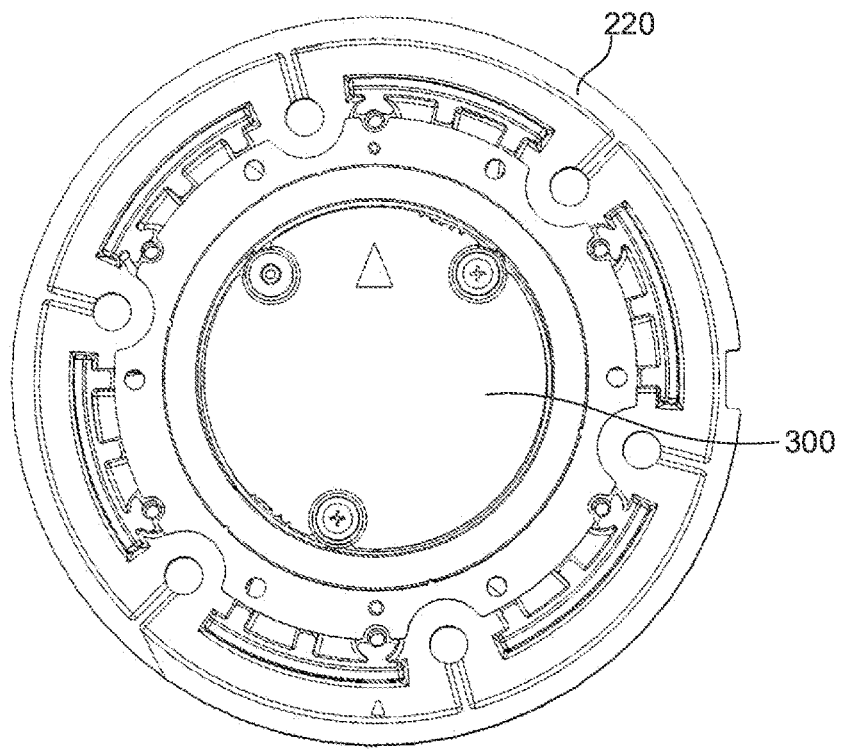
FIG. 17 is a top view illustrating a state in which an upper case is removed.
Figure 18:
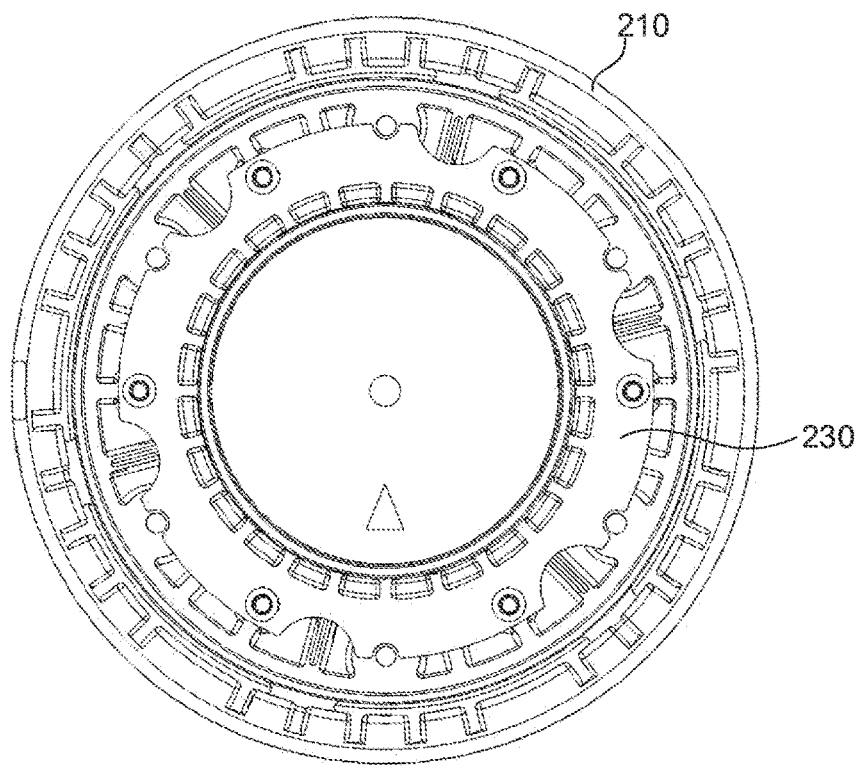
FIG. 18 is a bottom view illustrating a state in which a lower case is removed.
Figure 19:
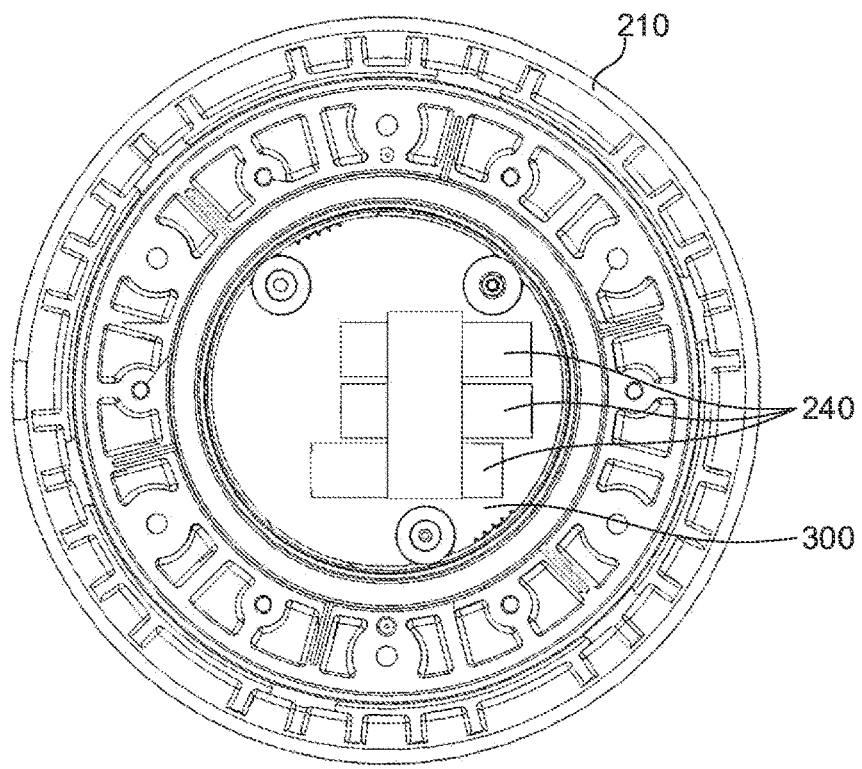
FIG. 19 is a bottom view illustrating a state in which a board protective case is removed.

FIG. 17 is a top view illustrating a state in which upper case 210 is removed. FIG. 18 is a bottom view illustrating a state in which lower case 220 is removed. Further, FIG. 19 is a bottom view illustrating a state in which board protective case 230 of FIG. 18 is removed. As can be seen from FIGS. 18 and 19, the lower-surface side of circuit board 300 is covered and protected by board protective case 230. Further, as can be seen in FIG. 19, batteries 240 are attached to the lower-surface side of circuit board 300.

Figure 20:
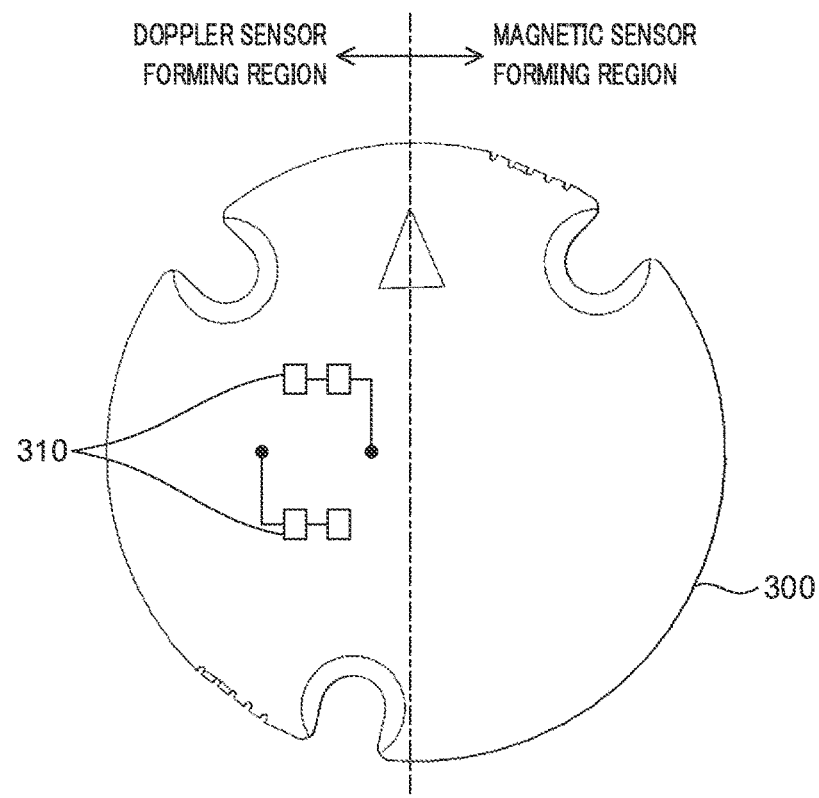
FIG. 20 is a top view of a circuit board.
Figure 21:
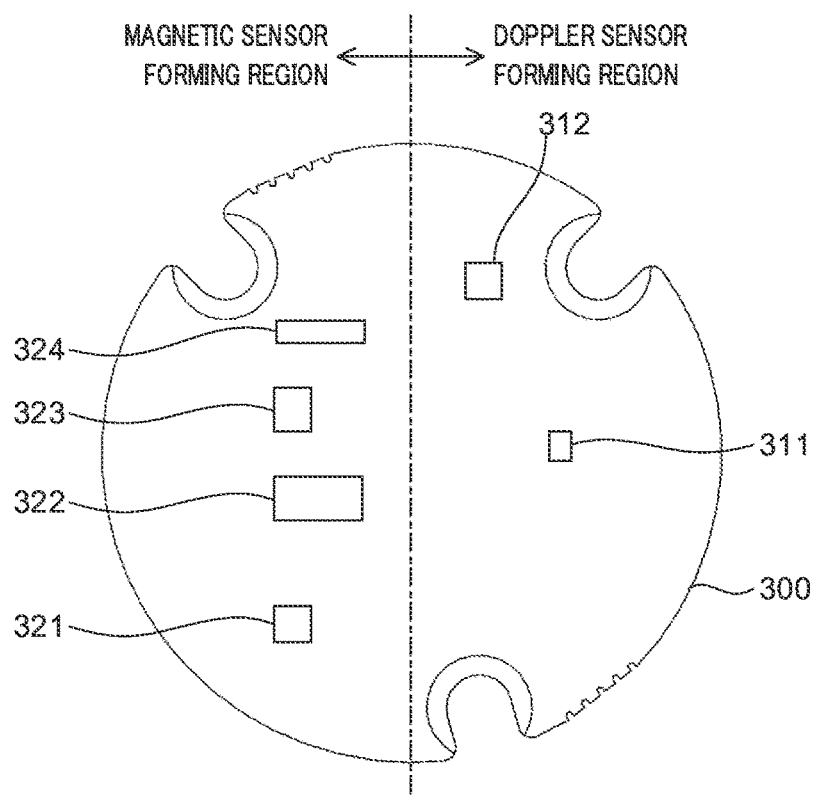
FIG. 21 is a bottom view of the circuit board.

FIG. 20 is a top view of circuit board 300. FIG. 21 is a bottom view of circuit board 300. As can be seen from these drawings, circuit board 300 is divided into two regions, which are a Doppler sensor forming region and a magnetic sensor forming region, at a boundary indicated by a dash-dotted line.

As illustrated in FIG. 20, antennas 310 of the 24 GHz band that transmit microwaves for performing Doppler detection are formed in the Doppler sensor forming region on an upper-surface side of circuit board 300.

As illustrated in FIG. 21, IC chip 311 of Doppler sensor 110 is mounted in the Doppler sensor forming region on the lower-surface side of circuit board 300. Further, power supply IC chip 312 is mounted in the Doppler sensor forming region.

On the other hand, IC chip 321 of magnetic sensor 120 is mounted in the magnetic sensor forming region on the lower-surface side of circuit board 300. Further, microcomputer chip 322 that implements the functions of change point detection section 130, level difference detection section 140, temperature coefficient calculation section 170, temperature correction section 160, and state determination section 150 is mounted in the magnetic sensor forming region. Further, radio communication IC chip 323 that wirelessly transmits a determination result obtained by state determination section 150 to the parking management apparatus is mounted in the magnetic sensor forming region. Further, ON/OFF switch 324 of a magnet type is mounted in the magnetic sensor forming region. Parking detection sensor 100 is configured such that a user causes a magnet to approach ON/OFF switch 324 from the outside of the case to turn on/off ON/OFF switch 324, thereby turning on/off the power supply.

Thus, in parking detection sensor 100, all circuit components except antenna 310 are mounted on the lower surface of circuit board 300, and all these circuit components are covered and packaged by board protective case 230 (FIG. 18).

<4> Summary

As described above, parking detection sensor 100 of the present embodiment includes: Doppler sensor 110; magnetic sensor 120 that detects magnetism on the X, Y and Z axes; change point detection section 130 that detects a change point in output of Doppler sensor 110 and output of magnetic sensor 120; level difference detection section 140 that detects a magnetic level difference over time in the output of Doppler sensor 110 and the output of magnetic sensor 120; and state determination section 150 that determines a parking state of a vehicle based on a detection result of change point detection section 130 and a detection result of level difference detection section 140, thereby improving the reliability of parking detection.

Further, according to parking detection sensor 100, state determination section 150 determines that a vehicle has been parked (step S24) in a case where a detection result indicating that a fluctuation in the Z axis of magnetic sensor 120 is larger than a predetermined threshold value is obtained in change point detection section 130 (step S20; YES) and a difference between an output level of Doppler sensor 110 during vacancy and a current output level of Doppler sensor 110 is larger than a predetermined threshold value in level difference detection section 140 (step S23; YES). Thus, it is possible to further improve the reliability of parking detection.

Further, according to parking detection sensor 100, even when a detection result indicating that a fluctuation in the Z axis of magnetic sensor 120 is equal to or less than a predetermined threshold value is obtained in change point detection section 130 (step S20; NO), state determination section 150 determines that a vehicle has been parked (step S32) in a case where a detection result indicating that a fluctuation in output of Doppler sensor 110 is larger than a predetermined threshold value is obtained in change point detection section 130 (step S30; YES) and a difference in an XYZ output level of magnetic sensor 120 during vacancy and a current XYZ output level of magnetic sensor 120 is larger than a predetermined threshold value in level difference detection section 140 (step S31; YES). Thus, it is possible to further improve the reliability of parking detection.

Further, according to parking detection sensor 100, state determination section 150 determines that a vehicle is determined to be parked in an adjacent or nearby parking lot in a case where detection results indicating that a fluctuation in the Z axis of magnetic sensor 120 is equal to or less than a predetermined threshold value in change point detection section 130 (step S20; NO) and a fluctuation in output of Doppler sensor 110 is equal to or less than a predetermined threshold value (step S30; NO) are obtained and a difference between an XYZ output level of magnetic sensor 120 during vacancy and a current XYZ output level of magnetic sensor 120 is larger than a predetermined threshold value in level difference detection section 140 (step S41; YES). Thus, it is possible to correctly detect that a vehicle has been parked in an adjacent or nearby parking lot.

Further, since parking detection sensor 100 includes state determination section 150, data to be sent from parking detection sensor 100 to an external management apparatus can be only a determination result obtained by state determination section 150. As a result, it is possible to significantly reduce the amount of data to be transmitted or the number of transmission in comparison with a case where measurement data obtained by Doppler sensor 110 and magnetic sensor 120 is sent as it is to the management apparatus. Accordingly, in a case where data is wirelessly transmitted, battery consumption can be reduced and the time when parking detection sensor 100 can be operated by the batteries can be lengthened.

One characteristic of parking detection sensor 100 of the present embodiment lies in determining whether a vehicle is above the sensor by using the magnitudes of a fluctuation in signals of Doppler sensor 110 and a fluctuation in a Z-axis signal of magnetic sensor 120. In other words, only the signals of Doppler sensor 110 and Z-axis data of magnetic sensor 120 (excluding X- and Y-axis data thereof) are taken and used. Thus, it is possible to reduce erroneous detection due to parking in a parking lot adjacent to a parking lot in which parking detection sensor 100 is installed. That is, when a vehicle has been parked in a parking lot adjacent to a parking lot in which parking detection sensor 100 is installed, it is possible to prevent occurrence of erroneous detection as if the vehicle had been parked in the parking lot in which parking detection sensor 100 is installed.

One characteristic of parking detection sensor 100 of the present embodiment lies in that values of the X, Y and Z axes of magnetic sensor 120 during vacancy are held, and that after it is determined that a vehicle is above the sensor, a detection result is obtained by using a difference between current values of magnetic sensor 120 and the held values of the sensor during vacancy. Thus, it is possible to know whether the vehicle has stopped above the sensor or has only passed through the sensor.

One characteristic of parking detection sensor 100 of the present embodiment lies in that in a case where no fluctuation is found in a Z-axis signal of magnetic sensor 120, but a fluctuation is found in a signal obtained by totaling X-, Y- and Z-axis signals of magnetic sensor 120, it is determined that a vehicle stops not above the sensor but in a place adjacent thereto, and at this time the update of values of the magnetic sensor during vacancy is stopped. Thus, it is possible to achieve an effect of preventing values of the magnetic sensor during vacancy from becoming erroneous.

One characteristic of parking detection sensor 100 of the present embodiment lies in that use of a fluctuation amount of a sensor signal makes it less susceptible to a component that slowly changes such as temperature drift.

Further, according to the present embodiment, Doppler sensor 110, magnetic sensor 120, change point detection section 130, level difference detection section 140, and state determination section 150 are mounted on one circuit board 300, which makes it possible to realize measurement through determination in a compact configuration, and to realize parking detection sensor 100 that is also easily installed in a parking area.

Further, a radio section (radio communication IC chip 323) that wirelessly transmits a determination result of state determination section 150 is mounted on circuit board 300 so that wiring connecting parking detection sensor 100 and the management apparatus (not illustrated) is not required.

The embodiment described above is only illustration of an exemplary embodiment for implementing the present invention, and the technical scope of the present invention shall not be construed limitedly thereby. That is, the present invention can be carried out in various forms without departing from the gist thereof or the main characteristics thereof.

In the embodiment described above, a case of performing parking detection by executing the determination processing flows of FIGS. 7 and 8 has been described, but the determination processing flows of FIGS. 7 and 8 are not necessarily required to be executed as they are. For example, some processing in the determination processing flows of FIGS. 7 and 8 may be omitted or changed. Alternatively, additional processing may be added thereto. Further, in order to increase resistance to noise, the determination of sensor signals may be performed a plurality of times. Further, in order to increase resistance to noise, magnetic sensor signals acquired a plurality of times may be averaged for use.

Further, it may also be configured such that a plurality of parking detection sensors 100 is installed and final determination is obtained by combining results of the plurality of parking detection sensors 100. That is, it may also be configured such that parking detection sensors 100 adjacent to each other are linked to each other to obtain a determination result.

Further, in the embodiment described above, a case in which magnetic sensor 120 that detects magnetism on the three axes (X, Y and Z axes) is used and parking is detected by using detection results of X, Y and Z signals has been described, but parking determination may be performed using, among each output of magnetic sensor 120 that is a triaxial magnetic sensor, only the Z-axis signal toward a vehicle or by using a uniaxial magnetic sensor (not illustrated) that detects a Z-axis signal toward a vehicle or a biaxial magnetic sensor (not illustrated) with two axes including a Z axis. The point is that it may be configured such that parking determination is performed using, among each output of the magnetic sensor, the Z-axis signal toward a vehicle. In this case, the processing on X and Y signals may be omitted from the embodiment described above. For example, in FIG. 7, it may be configured such that a Z level difference during vacancy is detected in step S21, a Z level difference during vacancy is detected in step S31, and a Z level difference during vacancy is detected in step S41. Further, a Z level difference during stop may be detected in step S61 of FIG. 8.

The disclosure of Japanese Patent Application No. 2019-109561, filed on Jun. 12, 2019, including the specification, drawings and abstract, is incorporated herein by reference in its entirety.

INDUSTRIAL APPLICABILITY

The present invention is widely applicable as a parking detection sensor.

REFERENCE SIGNS LIST

100 Parking detection sensor
110 Doppler sensor
120 Magnetic sensor
130 Change point detection section
140 Level difference detection section
150 State determination section
210 Upper case
220 Lower case
230 Board protective case
240 Battery
300 Circuit board
310 Antenna

The invention claimed is:

1. A parking detection sensor, comprising:
a Doppler sensor;
a magnetic sensor that detects magnetism on a Z axis toward a vehicle;
a change point detection section that applies differentiation processing to output of the Doppler sensor and output of the magnetic sensor and detects a change point;
a level difference detection section that detects a level difference over time in the output of the Doppler sensor and the output of the magnetic sensor; and
a state determination section that determines a parking state of the vehicle based on a differentiation result of the change point detection section and a level difference result of the level difference detection section, wherein,
the state determination section determines that the vehicle has been parked in a case where the differentiation result indicates that a fluctuation in the Z axis of the magnetic sensor is larger than a predetermined threshold value and the level difference result indicates that a level difference between an output level of the Doppler sensor dining vacancy and a current output level of the Doppler sensor is larger than a predetermined threshold value.

2. A parking detection sensor, comprising:
a Doppler sensor;
a magnetic sensor that detects magnetism on a Z axis toward a vehicle, a change point detection section that applies differentiation processing to output of the Doppler sensor and output of the magnetic sensor and detects a change point;

a level difference detection section that detects a level difference over time in the output of the Doppler sensor and the output of the magnetic sensor; and a state determination section that determines a parking state of the vehicle based on a differentiation result of the change point detection section and a level difference result of the level difference detection section, wherein, even in a case where the differentiation result indicates that a fluctuation in the Z axis of the magnetic sensor is equal to or less than a predetermined threshold value, the state determination section determines that the vehicle has been parked in a case where the differentiation result indicates that a fluctuation in the output of the Doppler sensor is larger than a predetermined threshold value and the level difference result indicates a difference between an output level of the magnetic sensor during vacancy and a current output level of the magnetic sensor is larger than a predetermined threshold value.

3. A parking detection sensor, comprising:

a Doppler sensor;

a magnetic sensor that detects magnetism on a Z axis toward a vehicle:

a change point detection section that applies differentiation processing to output of the Doppler sensor and output of the magnetic sensor and detects a change point;

a level difference detection section that detects a level difference over time in the output of the Doppler sensor and the output of the magnetic sensor; and a state determination section that determines a parking state of the vehicle based on a differentiation result of the change point detection section and a level difference result of the level difference detection section, wherein, the state determination section determines that the vehicle has been parked in an adjacent or nearby parking lot in a case where the differentiation results indicates that a fluctuation in the Z axis of the magnetic sensor is equal to or less than a predetermined threshold value and a fluctuation in the output of the Doppler sensor is equal to or less than a predetermined threshold value and the level difference result indicates a difference between an output level of the magnetic sensor during vacancy and a current output level of the magnetic sensor is larger than a predetermined threshold value.

4. The parking detection sensor according to claim 1, wherein the Doppler sensor, the magnetic sensor, the change point detection section, the level difference detection section, and the state determination section are mounted on one circuit board.

5. The parking detection sensor according to claim 4, wherein a radio section that wirelessly transmits a determination result of the state determination section is further mounted on the circuit board.

6. The parking detection sensor according to claim 5, wherein circuit components are mounted on an identical surface-side of the circuit board and are packaged by a case, the circuit components being the Doppler sensor, the magnetic sensor, the change point detection section, the level difference detection section, the state determination section, and the radio section.

7. The parking detection sensor according to claim 1, the Doppler sensor and the magnetic sensor are packaged in the same case and placed integrally on the ground, floor or ceiling corresponding to the parking lot.

* * * * *